US011737138B2

(12) United States Patent
Palat et al.

(10) Patent No.: US 11,737,138 B2
(45) Date of Patent: Aug. 22, 2023

(54) APPARATUS, SYSTEM AND METHOD OF COMMUNICATION OVER COMMON CONTROL CHANNELS

(71) Applicant: Apple Inc., Cupertino, CA (US)

(72) Inventors: Sudeep Palat, Cheltenham (GB); Yi Guo, Shanghai (CN); Yujian Zhang, Beijing (CN); Seau Sian Lim, Swindon (GB)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/446,973

(22) Filed: Jun. 20, 2019

(65) Prior Publication Data
US 2019/0306884 A1 Oct. 3, 2019

Related U.S. Application Data

(60) Provisional application No. 62/688,297, filed on Jun. 21, 2018.

(51) Int. Cl.
H04W 74/08 (2009.01)
H04W 84/12 (2009.01)

(52) U.S. Cl.
CPC ........ H04W 74/0816 (2013.01); H04W 84/12 (2013.01)

(58) Field of Classification Search
CPC .......................... H04W 74/0816; H04W 84/12
USPC ........................................................ 370/329
See application file for complete search history.

(56) References Cited

U.S. PATENT DOCUMENTS

| 11,140,717 | B2* | 10/2021 | Agiwal | H04W 28/065 |
| 2017/0332419 | A1* | 11/2017 | Kim | H04L 1/1861 |
| 2018/0176962 | A1* | 6/2018 | Wu | H04W 72/14 |
| 2018/0220288 | A1* | 8/2018 | Agiwal | H04W 8/005 |

(Continued)

OTHER PUBLICATIONS

R2-163368, "RA preamble partitioning for multiple CCCH SDU sizes", source NTT DOCOMO, Inc. (Year: 2016).*

(Continued)

Primary Examiner — Intekhaab A Siddiquee
(74) Attorney, Agent, or Firm — Sterne, Kessler, Goldstein & Fox P.L.L.C.

(57) ABSTRACT

Some demonstrative embodiments include devices, systems and/or methods of communication over common control channels. For example, an apparatus may include logic and circuitry configured to cause a User Equipment (UE) to determine a selected Common Control Channel (CCCH) message configuration from a first predefined message configuration and a second predefined message configuration, the first predefined message configuration having a first predefined message bit-size, the second predefined message configuration having a second predefined message bit-size; to generate an Uplink (UL) CCCH message according to the selected CCCH message configuration, the UL CCCH message comprising a Medium Access Control (MAC) header comprising a Logical Channel Identify (ID) (LCID) field having a value corresponding to the selected CCCH message configuration; and to transmit the UL CCCH message to a Next Generation Node B (gNB) over a logical channel corresponding to the selected CCCH message configuration.

25 Claims, 9 Drawing Sheets

(56) References Cited

U.S. PATENT DOCUMENTS

2019/0254114 A1* 8/2019 Son .................. H04L 5/001
2019/0349837 A1* 11/2019 Shih ................ H04W 76/11

OTHER PUBLICATIONS

62670227,Specification,May 11, 2018 (Year: 2018).*
3GPP TS 38.331 V15.2.1 (Jun. 2018); Technical Specification; 3rd Generation Partnership Project; Technical Specification Group Radio Access Network; NR; Radio Resource Control (RRC) protocol specification (Release 15), Jun. 2018, 303 pages.
3GPP TS 38.321 V15.2.0 (Jun. 2018); Technical Specification; 3rd Generation Partnership Project; Technical Specification Group Radio Access Network; NR; Medium Access Control (MAC) protocol specification (Release 15), Jun. 2018, 73 pages.

* cited by examiner

APPARATUS, SYSTEM AND METHOD OF COMMUNICATION OVER COMMON CONTROL CHANNELS

CROSS REFERENCE

This application claims the benefit of and priority from U.S. Provisional Patent Application No. 62/688,297 entitled "MECHANISMS FOR SUPPORTING MULTIPLE COMMON CONTROL LOGICAL CHANNELS", filed Jun. 21, 2018, the entire disclosure of which is incorporated herein by reference.

TECHNICAL FIELD

Some embodiments described herein generally relate to communication over common control channels.

BACKGROUND

A cellular network may include a plurality of User Equipment (UEs) and a plurality of cellular nodes, e.g., base stations.

Common Control Channels may be used to transfer control information between the UEs and the cellular nodes.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
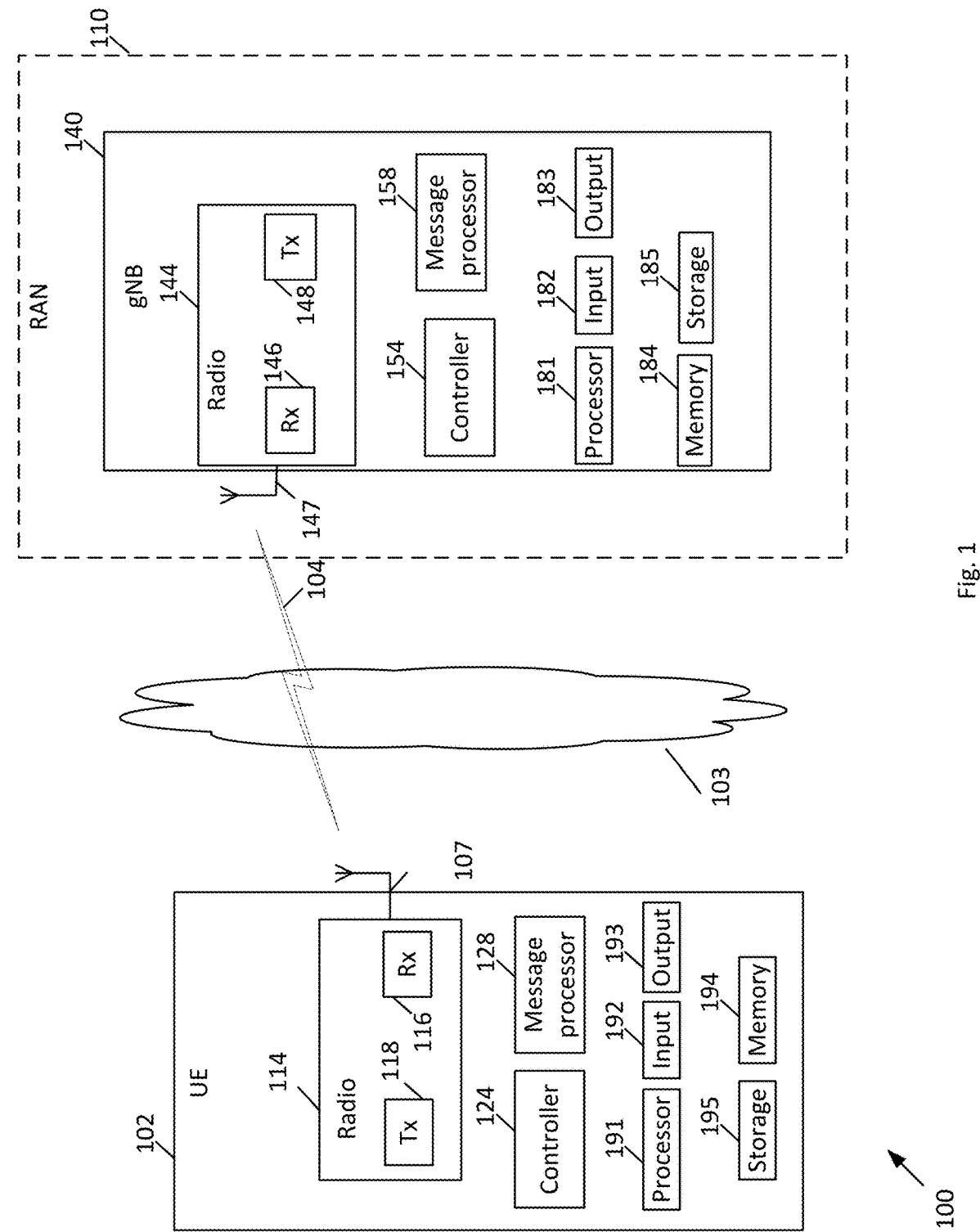
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing 3rd Generation Partnership Project (3GPP) and/or Long Term Evolution (LTE) specifications (including 3GPP TS 38.331 ("3GPP TS 38.331 V15.2.1 (2018-06); Technical Specification; 3rd Generation Partnership Project; Technical Specification Group Radio Access Network; NR; Radio Resource Control (RRC) protocol specification (Release 15)); and/or 3GPP TS 38.321 ("3GPP TS 38.321 V15.2.0 (2018-06); Technical Specification; 3rd Generation Partnership Project; Technical Specification Group Radio Access Network; NR; Medium Access Control (MAC) protocol specification (Release 15)")) and/or future versions and/or derivatives thereof, devices and/or networks operating in accordance with existing IEEE 802.11 standards (including IEEE 802.11-2016 (IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016), and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wireless Fidelity (Wi-Fi), Wi-Max, ZigBee™, Ultra-Wideband (UWB), Global System for Mobile communication (GSM), second generation (2G), 2.5G, 3G, 3.5G, 4G, Fifth Generation (5G) mobile networks, 3GPP, Long Term Evolution (LTE) cellular system, LTE advance cellular system, High-Speed Downlink Packet Access (HSDPA), High-Speed Uplink Packet Access (HSUPA), High-Speed Packet Access (HSPA), HSPA+, Single Carrier Radio Transmission Technology (1XRTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "cell", as used herein, may include a combination of network resources, for example, downlink and optionally uplink resources. The resources may be controlled and/or allocated, for example, by a node (also referred to as a "base station"), or the like. The linking between a carrier frequency of the downlink resources and a carrier frequency of the uplink resources may be indicated in system information transmitted on the downlink resources.

Some demonstrative embodiments are described herein with respect to an LTE network, a Fifth Generation (5G) network, or a New Radio (NR) network. However, other embodiments may be implemented in any other suitable cellular network or system, for example, future 3GPP systems, e.g., Sixth Generation (6G)) systems, and the like.

Other embodiments may be used in conjunction with any other suitable wireless communication network.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via one or more wireless mediums (WM). For example, system 100 may include at least one User Equipment (UE) 102, capable of communicating with one or more wireless communication networks and/or one or more cellular networks, e.g., as described below.

In one example, the term "user equipment" or "UE", as used herein, may include a device with radio communication capabilities, and/or may describe a remote user of network resources in a communications network. The term "user equipment" or "UE", as used herein, may include a client, a mobile, a mobile device, a mobile terminal, a user terminal, a mobile unit, a mobile station, a mobile user, a subscriber, a user, a remote station, an access agent, a user agent, a receiver, a radio equipment, a reconfigurable radio equipment, a reconfigurable mobile device, and/or the like.

In some demonstrative embodiments, UE 102 may include, for example, a Mobile Device (MD), a Station (STA), a mobile computer, a laptop computer, a notebook computer, a tablet computer, an Ultrabook™ computer, an Internet of Things (IoT) device, a wearable device, a sensor device, a mobile internet device, a handheld computer, a handheld device, a storage device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a video device, an audio device, an A/V device, a gaming device, a media player, a Smartphone, e.g., handheld touchscreen mobile computing devices connectable to one or more cellular networks, or the like.

In one example, the term "user equipment" or "UE", as used herein, may include any type of wireless and/or wired device or any computing device including a wireless communications interface.

In some demonstrative embodiments, UE 102 may include a mobile or a non-mobile computing device, for example, consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), Electronic/Engine Control Modules (ECMs), embedded systems, microcontrollers, control modules, engine management systems (EMS), networked or "smart" appliances, Machine-Type Communications (MTC) devices, Machine-To-Machine (M2M), Internet of Things (IoT) devices, and/or the like.

In some embodiments, UE 102 may include an IoT UE, which may include a network access layer designed for low-power IoT applications utilizing short-lived UE connections. An IoT UE may utilize technologies such as M2M or MTC for exchanging data with an MTC server or device, for example, via a Public Land Mobile Network (PLMN), Proximity-Based Service (ProSe) or device-to-device (D2D) communication, sensor networks, and/or IoT networks. The M2M or MTC exchange of data may be a machine-initiated exchange of data.

In one example, an IoT network may describe interconnecting IoT UEs, which may include uniquely identifiable embedded computing devices, e.g., within an Internet infrastructure, with short-lived connections. For example, the IoT UEs may execute background applications, e.g., keep-alive messages, status updates, and the like, to facilitate connections of the IoT network.

In some demonstrative embodiments, system 100 may include an Access Network (AN), for example, a Radio Access Network (RAN) 110, e.g., as described below.

In some demonstrative embodiments, RAN 110 may include for example, an Evolved Universal Mobile Telecommunications System (UMTS) Terrestrial Radio Access Network (E-UTRAN), an NG RAN or a 5G RAN, for example, in accordance with 3GPP Technical Specifications (TS).

In other embodiments, RAN 110 may include any other RAN, e.g., a legacy RAN, for example, a UMTS Terrestrial Radio Access Network (UTRAN) or Global System for Mobile Communications or Groupe Special Mobile (GSM) EDGE (GSM Evolution) Radio Access Network (GERAN).

In one example, the term "NG RAN", as used herein, may include a RAN that operates in an NR or 5G system, and/or the term "E-UTRAN", as used herein, may include a RAN that operates in an LTE or a 4G system.

In some demonstrative embodiments, UE 102 may communicate with RAN 110, for example, via one or more channels or connections 104, e.g., as described below.

In some demonstrative embodiments, channels 104 may include a physical communications interface or layer, e.g., as described below.

In one example, the term "channel", as used herein, may include any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally or alternatively, the term "link", as used herein, may refer to a connection between two devices through a Radio Access Technology (RAT) for a purpose of transmitting and/or receiving information.

In some demonstrative embodiments, channels 104 may include an air interface to enable communicative coupling, for example, in accordance with 3GPP Specifications. For example, channels 104 may be configured in accordance with cellular communications protocols, e.g., a Global System for Mobile Communications (GSM) protocol, a Code-Division Multiple Access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and/or any of the other communications protocols discussed herein.

In some demonstrative embodiments, RAN 110 may include at least one node, e.g., a base station (BS), for example, to manage communication of RAN 110 and/or to enable connections or channels 104, e.g., as described below.

In some demonstrative embodiments, the node may include, may operate as, and/or may perform the functionality of, a next Generation Node B (gNB) 140, e.g., as described below.

In other embodiments, the node may include a Base Station (BS), RAN nodes, evolved NodeBs (eNBs), NodeBs, Road Side Units (RSUs), Transmission Reception Points (TRxPs or TRPs), and the like. For example, the node may include ground stations, e.g., terrestrial access points, or satellite stations, providing coverage within a geographic area, e.g., a cell.

In one example, the term "Road Side Unit" or "RSU", as used herein, may refer to any transportation infrastructure entity implemented in or by a gNB/eNB/RAN node or a stationary. An RSU implemented in or by a UE may be referred to as a "UE-type RSU", an RSU implemented in or by an eNB may be referred to as an "eNB-type RSU."

In one example, the term "NG RAN node", as used herein, may refer to a RAN node that operates in an NR or 5G system, e.g., a gNB, and/or the term "E-UTRAN node", as used herein, may refer to a RAN node that operates in an LTE or 4G system, e.g., an eNB.

In some demonstrative embodiments, gNB 140 may be implemented as one or more of a dedicated physical device such as a macrocell base station, and/or a Low Power (LP) base station for providing femtocells, picocells or other like cells having smaller coverage areas, smaller user capacity, and/or higher bandwidth, e.g., compared to macrocells.

In other embodiments, gNB 140 may be implemented as one or more software entities running on server computers as part of a virtual network, which may be referred to as a Cloud Radio Access Network (CRAN).

In other embodiments, gNB 140 may represent individual gNB-Distributed Units (DUs) that are connected to a gNB-Centralized Unit (CU), e.g., via an F1 interface.

In some demonstrative embodiments, gNB 140 may be configured to terminate an air interface protocol and/or may be the first point of contact for the UE 102.

In some demonstrative embodiments, gNB 140 may be configured to perform various logical functions for the RAN 110 including, for example, Radio Network Controller (RNC) functions, e.g., radio bearer management, uplink and downlink dynamic radio resource management and data packet scheduling, mobility management, and/or any other additional or alternative functionalities.

In other embodiments, gNB 140 may include any other functionality and/or may perform the functionality of any other cellular node, network controller, base station, or any other node or network device.

In some demonstrative embodiments, elements of system 100 may be capable of communicating over one or more wireless mediums, for example, a radio channel, a cellular channel, an RF channel, a WiFi channel, an IR channel, and the like. One or more elements of system 100 may optionally be capable of communicating over any suitable wired communication links.

In some demonstrative embodiments, UE 102 and/or gNB 140 may include one or more communication interfaces to perform communication between UE 102, gNB 140, and/or with one or more other wireless communication devices, e.g., as described below.

In some demonstrative embodiments, gNB 140 may include an air interface, for example, a radio 144, including circuitry and/or logic configured to communicate with UE 102 via the channels 104.

In some demonstrative embodiments, UE 102 may include an air interface, for example, a radio 114, including circuitry and/or logic configured to communicate with RAN 110, for example, via a node, e.g., gNB 140, via the channels 104.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114, radio 144, transmitter 118, transmitter 148, receiver 116, and/or receiver 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative embodiments, radio 114 and/or radio 144 may include, or may be associated with, one or more antennas. For example, radio 114 may include, or may be associated with, one or more antennas 107; and/or radio 144 may include, or may be associated with, one or more antennas 147.

In one example, UE 102 may include a single antenna 107. In another example, UE 102 may include two or more antennas 107.

In one example, gNB 140 may include a single antenna 147. In another example, gNB 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, UE 102 may include a controller 124, and/or gNB 140 may include a controller 154. Controller 124 may be configured to perform and/or to trigger, cause, instruct and/or control UE 102 to perform, one or more communications, to generate and/or communicate one or more messages and/or transmissions, and/or to perform one or more functionalities, operations and/or procedures between UE 102 and gNB 140, and/or one or more other devices; and/or controller 154 may be configured to perform, and/or to trigger, cause, instruct and/or control gNB 140 to perform, one or more communications, to generate and/or communicate one or more messages and/or transmissions, and/or to perform one or more functionalities, operations and/or procedures between UE 102 and gNB 140, and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a device, e.g., UE 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a device, e.g., gNB 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative embodiments, UE 102 may include a message processor 128 configured to generate, process and/or access one or messages communicated by UE 102.

In one example, message processor 128 may be configured to generate one or more messages to be transmitted by UE 102, and/or message processor 128 may be configured to access and/or to process one or more messages received by UE 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a communication medium, e.g., over a wireless communication channel in a wireless communication frequency band, for example, by applying to one or more fields of the PPDU one or more transmit waveforms. In other embodiments, message processor 128 may be configured to perform any other additional or alternative functionality and/or may include any other additional or alternative components to generate and/or process a message to be transmitted.

In some demonstrative embodiments, gNB 140 may include a message processor 158 configured to generate, process and/or access one or messages communicated by gNB 140.

In one example, message processor 158 may be configured to generate one or more messages to be transmitted by gNB 140, and/or message processor 158 may be configured to access and/or to process one or more messages received by gNB 140, e.g., as described below.

In one example, message processor 158 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a communication medium, e.g., over a wireless communication channel in a wireless communication frequency band, for example, by applying to one or more fields of the PPDU one or more transmit waveforms. In other embodiments, message processor 158 may be configured to perform any other additional or alternative functionality and/or may include any other additional or alternative components to generate and/or process a message to be transmitted.

In some demonstrative embodiments, message processors 128 and/or 158 may include circuitry and/or logic, e.g., processor circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of UE 102, and/or the functionality of message processor 158 may be implemented as part of any other element of gNB 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of UE 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of gNB 140.

In some demonstrative embodiments, UE 102 may include, for example, one or more of a processor 191, an input unit 192, an output unit 193, a memory unit 194, and/or a storage unit 195; and/or gNB 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of UE 102 and/or gNB 140 may be enclosed in a common housing or packaging, and may be interconnected or operably associated using one or more wired or wireless links. In other embodiments, components of UE 102 and/or gNB 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of UE 102 and/or of one or more suitable applications. Processor 181 may execute instructions, for example, of an Operating System (OS) of gNB 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by UE 102. Memory unit 184 and/or storage unit 185, for example, may store data processed by gNB 140.

In some demonstrative embodiments, UE 102 and gNB 140 may communicate over a one or more Common Control Channel (CCCH) messages, for example, over one or more CCCH logical channels, e.g., as described below.

In some demonstrative embodiments, an NR radio interface, e.g., radio 114 and/or radio 144, may be configured to support a small CCCH message of 48 bits, e.g., in a worst case scenario, and/or to support a large CCCH message of more than 64 bits, e.g., in other cases.

In some demonstrative embodiments, a transport block size may be used, for example, to determine a CCCH message size, e.g., for LTE. However, this approach may not be defined for NR. For example, the transport block size may not be used in NR, and a specific logical channel ID (LCID) value may indicate 48 bit. Therefore, there may be a need to define a solution for NR, for example, for a 64-bit CCCH message.

In one example, using an extra bit in a 64-bit CCCH message, e.g., to indicate the 64 bit CCCH message, for example, in compliance with LTE, may be inefficient, e.g., may be size constraining.

In one example, a CCCH message without a length field, and with a new LCID may be supported. For example, a payload length corresponding to the new LCID may be fixed to a size of 48 bits, e.g., as follows:

TABLE 1

| Index | LCID value |
|---|---|
| 100001 | CCCH of size 48 bits |

In some demonstrative embodiments, there may be a need to support at least two different CCCH sizes, e.g., including CCCH sizes of 48 bits and 64 bits, for example, to fit Transport Block (TB) sizes corresponding to payloads of 56 bits and 72 bits, e.g., including a MAC header. In other embodiments, any other additional or alternative CCCH message sizes may be implemented.

In some demonstrative embodiments, 64-bit CCCH message configurations and/or indications may be defined, e.g., as described below.

For example, a user plane may support a new LCID for a fixed CCCH message of 48 bits. For example, a CCCH LCID may be used with a two-octet MAC header including a length field. According to this example, neither of the LCIDs can be used for a CCCH message of 64 bits, e.g., when the TB can only support 72 data bits.

Some demonstrative embodiments may be implemented to define an additional LCID, for example, for a fixed 64 bit CCCH message.

In some demonstrative embodiments, the user plane may be changed to use a second CCCH LCID, for example, when a message (msg3) does not contain any other MAC Control Element (CE).

In some demonstrative embodiments, a new LCID may be used for a 64 bit CCCH message, e.g., an LCID different from the LCID for 48 bit CCCH messages, e.g., as described below.

In some demonstrative embodiments, a new logical CCCH channel (CCCH1) may be defined, for example, to correspond to the new LCID, e.g., as described below.

In some demonstrative embodiments, a new set of one or more CCCH messages may be defined to communicate on the logical CCCH1 channel and/or to use the new LCID, e.g., as described below.

In some demonstrative embodiments, larger CCCH messages, e.g., 64-bit CCCH messages, may be associated, e.g., only associated, with the new CCCH, e.g., the CCCH1, and/or may use the new LCID, e.g., as described below.

In some demonstrative embodiments, using the new LCID and/or the new CCCH channel may provide forward compatibility, for example, for extensions in the future, and/or may free up one bit in a CCCH message of a smaller size, e.g., the 48-bit CCCH message.

Some demonstrative embodiments may be implemented to provide a capability to define larger versions, e.g., even for all other CCCH messages, and/or new CCCH messages.

Some demonstrative embodiments may be implemented to define a new LCID, e.g., an additional LCID, for example, for fixed 64 bit CCCH messages, e.g., as described below.

In some demonstrative embodiments, the new LCID may be used to indicate any suitable 64 bit CCCH messages, e.g., of one or more types as described below. For example, one or more CCCH messages, e.g., even all CCCH messages, may benefit from using 64 bit CCCH messages, for example, to carry additional information and/or to have spare values for later releases.

In some demonstrative embodiments, a new CCCH logical channel, e.g., CCCH1, for 64 bit messages may be defined, e.g., as described below.

In some demonstrative embodiments, 64 bit versions of one or more other messages may be defined in the future.

Some demonstrative embodiments may be implemented to define a CCCH, e.g., CCCH1, for 64 bit CCCH messages, e.g., different from a CCCH for 48 bit CCCH messages, e.g., as described below.

In some demonstrative embodiments, the CCCH for 64 bit CCCH messages, e.g., CCCH1, may be used, for example, to support even all 64 bit messages. Hence, it may not be necessary to use a previously agreed construct to define a choice of Radio Network Temporary Identity (I-RNTI) lengths for a same Resume request message, e.g., as described below.

Some demonstrative embodiments may be implemented to define any other additional or alternative CCCH messages, for example, other 64 bit CCCH messages and/or any other CCCH messages of any other predefined size, e.g., to communicate over any other CCCH logical channel, e.g., as described below.

In some demonstrative embodiments, UE 102 may be configured determine a selected CCCH message configuration, e.g., for a CCCH message, e.g., as described below.

In some demonstrative embodiments, gNB 140 may be configured to indicate to UE 102 on the selected CCCH message configuration, e.g., as described below.

In some demonstrative embodiments, controller 124 may be configured to control, cause and/or trigger UE 102 to determine a selected Common Control Channel (CCCH) message configuration from a first predefined message configuration and a second predefined message configuration, e.g., as described below.

In some demonstrative embodiments, the first predefined message configuration may have a first predefined message bit-size, and/or the second predefined message configuration may have a second predefined message bit-size, e.g., as described below.

In some demonstrative embodiments, the first predefined message bit-size may include a 48-bit size, and/or the second predefined message bit-size may include a 64-bit size, e.g., as described below.

In other embodiments, the first predefined message bit-size may include any other bit size, and/or the second predefined message bit-size may include any other bit size, for example, different from the first predefined message bit-size.

In some demonstrative embodiments, controller 124 may be configured to control, cause and/or trigger UE 102 and/or message processor 128 to generate an Uplink (UL) CCCH message according to the selected CCCH message configuration, e.g., as described below.

In some demonstrative embodiments, the UL CCCH message may include a Medium Access Control (MAC) header including a Logical Channel Identify (ID) (LCID) field having a value corresponding to the selected CCCH message configuration, e.g., as described below.

In some demonstrative embodiments, controller 124 may be configured to control, cause and/or trigger UE 102 and/or radio 114 to transmit the UL CCCH message to gNB 140 over a logical channel corresponding to the selected CCCH message configuration, e.g., as described below.

In some demonstrative embodiments, controller 124 may be configured to control, cause and/or trigger UE 102 to determine the selected CCCH message configuration, for example, based on an indication in a message from the gNB 140.

In some demonstrative embodiments, controller 124 may be configured to control, cause and/or trigger UE 102 to determine the selected CCCH message configuration, for example, based on an indication in a broadcast message from the gNB 140.

In some demonstrative embodiments, gNB 140 may broadcast or transmit the indication of the selected CCCH message configuration, e.g., as described below.

In some demonstrative embodiments, controller 154 may be configured to control, cause and/or trigger gNB 140 and/or radio 144 to transmit the message including the indication of the selected CCCH message configuration from the first predefined message configuration having the first predefined message bit-size and the second predefined message configuration having the second predefined message bit-size, e.g., as described below.

In some demonstrative embodiments, controller 154 may be configured to control, cause and/or trigger gNB 140 and/or radio 144 to broadcast the message, e.g., as described below.

In some demonstrative embodiments, controller 154 may be configured to control, cause and/or trigger gNB 140 and/or radio 144 to receive the UL CCCH message from UE 102 over the logical channel corresponding to the selected CCCH message configuration. For example, the UL CCCH message may include the MAC header including the LCID field having the value corresponding to the selected CCCH message configuration, e.g., as described below.

In some demonstrative embodiments, the UL CCCH message may include a Radio Resource Control (RRC) message, e.g., as described below.

In some demonstrative embodiments, the first predefined message configuration may correspond to a first CCCH message type, and/or the second predefined message configuration may correspond to a second CCCH message type, for example, different from the first CCCH message type, e.g., as described below.

In some demonstrative embodiments, the first predefined message configuration may include a first identifier field having a first predefined bit-size, and/or the second predefined message configuration may include a second identifier field having a second predefined bit-size, for example, different from the first predefined bit-size, e.g., as described below.

In some demonstrative embodiments, the LCID field may include a first predefined LCID value, or a second predefined LCID value, for example, based on the selected CCCH message configuration, e.g., as described below.

In some demonstrative embodiments, the LCID field may include a first predefined LCID value, for example, when the selected CCCH message configuration includes the first predefined message configuration, and the LCID field may include a second predefined LCID value, different from the first predefined LCID value, when the selected CCCH message configuration includes the second predefined message configuration, e.g., as described below.

In some demonstrative embodiments, controller 124 may be configured to control, cause and/or trigger UE 102 to set the LCID field to the first predefined LCID value, for example, when the selected CCCH message configuration includes the first predefined message configuration, e.g., as described below.

In some demonstrative embodiments, controller 124 may be configured to control, cause and/or trigger UE 102 to set the LCID field to the second predefined LCID value, different from the first predefined LCID value, for example, when the selected CCCH message configuration includes the second predefined message configuration, e.g., as described below.

In some demonstrative embodiments, a new, e.g., an additional, LCID value may be defined, for example, for a fixed 64 bit CCCH message. According to this example, if the new LCID is used for 64 bit CCCH messages, then it may be used for any 64 bit CCCH messages. For example, CCCH messages may benefit, for example, from using 64 bit CCCH messages, e.g., to carry additional information and/or from having spare values for later releases.

In some demonstrative embodiments, one or more LCID values may be defined, for example, for a MAC layer, e.g., as follows:

TABLE 2

| Index | LCID value |
| --- | --- |
| 000000 | CCCH of size other than 48 bits |
| 000001-100000 | Identity of the logical channel |
| 100001 | CCCH of size 48 bits |
| 100010 | CCCH1 of size 64 bits |
| 100011-110101 | Reserved |
| 110110 | Multiple Entry PHR (four octet Ci) |
| 110111 | Configured Grant Confirmation |
| 111000 | Multiple Entry PHR (one octet Ci) |
| 111001 | Single Entry PHR |
| 111010 | C-RNTI |
| 111011 | Short Truncated BSR |
| 111100 | Long Truncated BSR |

TABLE 2-continued

| Index | LCID value |
| --- | --- |
| 111101 | Short BSR |
| 111110 | Long BSR |
| 111111 | Padding |

For example, according to Table 2, a first LCID value, e.g., a value of "100001", may be defined to indicate a 48-bit CCCH message configuration; and/or a second LCID value, e.g., a value of "100010", may be defined to indicate a 64-bit CCCH message configuration.

In other embodiments, any other LCID values may be defined for 48-bit CCCH message configuration, the 64-bit CCCH message configuration, and/or any other additional or alternative CCCH message configuration of any other predefined message size.

In some demonstrative embodiments, UE 102 may set the LCID field according to Table 2m for example, to a value of "100001", for example, when the selected CCCH message configuration includes the CCCH of size 48 bits.

In some demonstrative embodiments, UE 102 may set the LCID field according to Table, 2, for example, to a value of "100010", for example, when the selected CCCH message configuration includes the CCCH1 of size 64 bits.

In some demonstrative embodiments, a first predefined message configuration, e.g., the 48-bit CCCH message configuration, may correspond to a first logical channel, and/or a second predefined message configuration, e.g., the 64-bit CCCH message configuration, may correspond to a second logical channel, e.g., as described below.

In some demonstrative embodiments, controller 124 may be configured to control, cause and/or trigger UE 102 to transmit the UL CCCH message over a first logical channel (CCCH channel), for example, when the selected CCCH message configuration includes the first predefined message configuration, e.g., as described below.

In some demonstrative embodiments, controller 124 may be configured to control, cause and/or trigger UE 102 to transmit the UL CCCH message over a second logical channel (CCCH1 channel), for example, when the selected CCCH message configuration includes the second predefined message configuration, e.g., as described below.

In some demonstrative embodiments, controller 154 may be configured to control, cause and/or trigger gNB 140 and/or radio 144 to receive the UL CCCH message over the first logical channel (CCCH channel), for example, when the selected CCCH message configuration includes the first predefined message configuration, e.g., as described below.

In some demonstrative embodiments, controller 154 may be configured to control, cause and/or trigger gNB 140 and/or radio 144 to receive the UL CCCH message over the second logical channel (CCCH1 channel), for example, when the selected CCCH message configuration includes the second predefined message configuration, e.g., as described below.

In some demonstrative embodiments, a plurality of message formats may be defined as variations of a CCCH message, for example, a Radio Resource Control (RRC) message, e.g., as described below.

In some demonstrative embodiments, for example, at least first and second message formats may be defined for an RRC message. For example, the first and second message formats may have first and second respective different CCCH sizes, e.g., as described below.

In some demonstrative embodiments, the first and second message formats may be configured to carry different information and/or information fields of different lengths, e.g., as described below.

In some demonstrative embodiments, for example, a first message format may have a first CCCH size and may include a field having a first field size configured to carry a truncated version of particular information; and a second message format may have a second CCCH size, e.g., longer than the first CCCH size, and may include a field having a second field size, e.g., longer than the first field size, which may be configured to carry a longer version, e.g., even a full version, of particular information.

In some demonstrative embodiments, the UL CCCH message may include a RRC Resume Request message, e.g., as described below.

In one example, the RRCResumeRequest message may be used to request a resumption of a suspended RRC connection and/or to perform an RAN-level Notification Areas (RNA) update.

In some demonstrative embodiments, the RRC Resume Request message may include a 16-bit resume Message Authentication Code for Integrity (resumeMAC-I) field, and/or a Resume Cause (ResumeCause) field, e.g., as described below.

In some demonstrative embodiments, for example, first and second message formats may be defined for the RRC Resume Request message. For example, the first and second RRC Resume Request message formats may have first and second respective different CCCH sizes, e.g., as described below.

In some demonstrative embodiments, the first and second RRC Resume Request message formats may be configured to carry different information and/or information fields of different lengths, e.g., as described below.

In some demonstrative embodiments, the first predefined message configuration e.g., the 48-bit CCCH message configuration, may include a first Radio Resource Control (RRC) Resume Request (RRCResumeRequest) message configuration, and/or the second predefined message configuration, e.g., the 64-bit CCCH message configuration, may include a second RRC Resume Request (RRCResumeRequest1) message configuration, e.g., as described below.

In some demonstrative embodiments, the first RRC Resume Request message configuration may include a first resume identity (ResumeIdentity) field having a first predefined ResumeIdentity bit-size, and/or the second RRC Resume Request message configuration may include a second resume identity field having a second predefined ResumeIdentity bit-size, for example, shorter than the first predefined ResumeIdentity bit-size, e.g., as described below.

In some demonstrative embodiments, the second RRC Resume Request message configuration may include a 40-bit resume identity (ResumeIdentity) field configured for a 40-bit Radio Network Temporary Identity (RNTI) value, and the first RRC Resume Request message configuration may include a 16-bit resume identity field configured for a 16-bit truncated RNTI value, e.g., as described below.

In one example, an I-RNTI-Value Information Element (IE) may be used to identify a suspended UE context of a UE, e.g., UE 102, in an inactive state, e.g., an RRC_INACTIVE state.

In other embodiments, the UL CCCH message may include any other RRC message and/or any other type of UL CCCH message, e.g., as described below.

In some demonstrative embodiments, the UL CCCH message may include an RRC Setup Request (RRCSetupRequest), an RRC Reestablishment Request (RRCReestablishmentRequest), or an RRC System Information (Info) Request (RRCSystemInfoRequest), e.g., as described below. In other embodiments, any other additional or alternative RRC message may be defined.

In some demonstrative embodiments, UE 102 and/or gNB 140 may be configured to generate, communicate, transmit, receive, and/or process RRC messages of one or more RRC message types over an uplink CCCH logical channel, for example, over a 64-bit UL CCCH (UL CCCH1), e.g., as described below.

In some demonstrative embodiments, the one or more RRC message types may be defined according to an UL message class (UL-CCCH1), which may defined RRC message types to be communicated over the UL CCCH1 logical channel, e.g., as follows:

```
-    UL-CCCH1-Message
The UL-CCCH1-Message class is the set of RRC messages that may be
sent from the UE to the Network on the uplink CCCH1 logical channel.
-- ASN1START
-- TAG-UL-CCCH-MESSAGE-START
UL-CCCH1-Message ::= SEQUENCE {
message UL-CCCH1-MessageType
}
UL-CCCH1-MessageType ::= CHOICE {
c1                          CHOICE {
 rrcSetupRequest1                RRCSetupRequest1,
 rrcResumeRequest1               RRCResumeRequest1,
 rrcReestablishmentRequest1      RRCReestablishmentRequest1,
 rrcSystemInfoRequest1           RRCSystemInfoRequest1
},
messageClassExtension SEQUENCE { }
}
-- TAG-UL-CCCH-MESSAGE-STOP
-- ASN1STOP
```

In some demonstrative embodiments, the UL-CCCH1-Message class may define one or more CCCH message types, for example, a RRC Setup Request (RRCSetupRequest1), a RRC Resume Request (RRCResumeRequest1), a RRC Reestablishment Request (RRCReestablishmentRequest1), and/or a RRC System Info Request (RRCSystemInfoRequest1).

In other embodiments, the UL CCCH message class may include or define any other additional or alternative UL CCCH message types.

In some demonstrative embodiments, the RRCResumeRequest1 message may be defined, e.g., as follows:

RRCResumeRequest1

The RRCResumeRequest1 message is used to request the resumption of a suspended RRC connection or perform an RNA update.

Signalling radio bearer: SRB0
RLC-SAP: TM
Logical channel: CCCH1
Direction: UE to Network RRCResumeRequest1 Message

```
-- ASN1START
-- TAG-RRCRESUMEREQUEST1-START
RRCResumeRequest1 ::= SEQUENCE {
 rrcResumeRequest1          RRCResumeRequest1-IEs
}
RRCResumeRequest1-IEs ::=    SEQUENCE {
 resumeIdentity                 I-RNTI-Value, --40bits
 resumeMAC-I                    BIT STRING (SIZE (16)),
```

```
resumeCause          ResumeCause,
spare                BIT STRING (SIZE (1))
}
ResumeCause ::=      ENUMERATED {
emergency, highPriorityAccess, mt-Access, mo-Signalling,mo-Data,
mo-VoiceCall, rna-Update, spare1, spare2, spare3, spare4, spare5, spare6,
spare7, spare8, spare9 }
-- TAG-RRCRESUMEREQUEST1-STOP
-- ASN1STOP
```

In other embodiments, the RRCResumeRequest1 may include any other structure, syntax, parameters, language and the like.

In one example, for example, the for a future study, the RRCResumeRequest1 may be configured to support one or more additional resume causes, e.g., delayTolerantAccess, RNA Update, periodic RNA Update, MO video, MO SMS, and/or any other resume cause.

In some demonstrative embodiments, a 40-bit RNTI value in the 40-bit resume identity (ResumeIdentity) field in the RRCResumeRequest1 message may be defined, e.g., as follows:

I-RNTI-Value

The I-RNTI-Value IE is used to identify the suspended UE context of a UE in RRC_INACTIVE.

I-RNTI-Value Information Element

```
-- ASN1START
-- TAG-I-RNTI-VALUE-START
I-RNTI-Value ::=  BIT STRING (SIZE(40))
-- TAG-I-RNTI-VALUE-STOP
-- ASN1STOP
```

In other embodiments, the 40-bit RNTI value in the RRCResumeRequest1 message may include any other structure, syntax, parameters, language and the like.

In some demonstrative embodiments, UE 102 and/or gNB 140 may be configured to communicate one or more RRC message types over an uplink CCCH logical channel, for example, over a 48 bit UL CCCH, e.g., as described below.

In some demonstrative embodiments, UE 102 and/or gNB 140 may be configured to communicate an RRC Resume Request (RRCResumeRequest) message over the 48-bit UL CCCH. In other embodiments, UE 102 and/or gNB 140 may be configured to communicate any other type of messages over the 48-bit UL CCCH.

For example, the RRCResumeRequest message, may be defined, e.g., as follows:

RRCResumeRequest
  Signalling radio bearer: SRB0
  RLC-SAP: TM
  Logical channel: CCCH
  Direction: UE to Network RRCResumeRequest Message

```
-- ASN1START
-- TAG-RRCRESUMEREQUEST-START
RRCResumeRequest ::= SEQUENCE {
rrcResumeRequest     RRCResumeRequest-IEs
}
RRCResumeRequest-IEs ::=    SEQUENCE {
resumeIdentity       truncated-i-RNTI  BIT STRING
                     (SIZE (24)),
resumeMAC-I          BIT STRING (SIZE (16)),
resumeCause          ResumeCause,
spare                BIT STRING (SIZE (1))
}
-- FFS Which additional resume causes are supported:
delayTolerantAccess, RNA Update, periodic RNA Update, MO video,
MO SMS, etc.
ResumeCause ::=      ENUMERATED {
                     emergency, highPriorityAccess, mt-Access, mo-
Signalling,
                     mo-Data, mo-VoiceCall, rna-Update, spare1,
spare2, spare3, spare4,
                     spare5, spare6, spare7, spare8, spare9 }
-- TAG-RRCRESUMEREQUEST-STOP
-- ASN1STOP
```

In other embodiments, the RRC Resume Request (RRCResumeRequest) message may include any other structure, syntax, parameters, language and the like.

In some demonstrative embodiments, UE 102 may be configured to select between a 48-bit CCCH message configuration or a 64-bit CCCH message configuration, to generate an UL CCCH message according to the selected CCCH message configuration, and to transmit the UL CCCH message over a CCCH logical channel according to the selected CCCH message configuration. For example, UE 102 may generate the RRCResumeRequest and transmit the RRCResumeRequest over the UL CCCH logical channel, e.g., when the 48-bit CCCH message configuration is selected; and/or UE 102 may generate the RRCResumeRequest1 and transmit the RRCResumeRequest1 over the UL CCCH1 logical channel, e.g., when the 64-bit CCCH message configuration is selected, e.g., as described above.

In some demonstrative embodiments, UE 102 may set the resumeIdentity field in the RRCResumeRequest message to include a 24-bit ID value, e.g., the truncated-i-RNTI, for example, when the 48-bit CCCH message configuration is selected, e.g., as described above.

In some demonstrative embodiments, UE 102 may set the resumeIdentity field in the RRCResumeRequest1 message to include a 40-bit ID value, e.g., the i-RNTI, for example, when the 64-bit CCCH message configuration is selected, e.g., as described above.

Figure 2:
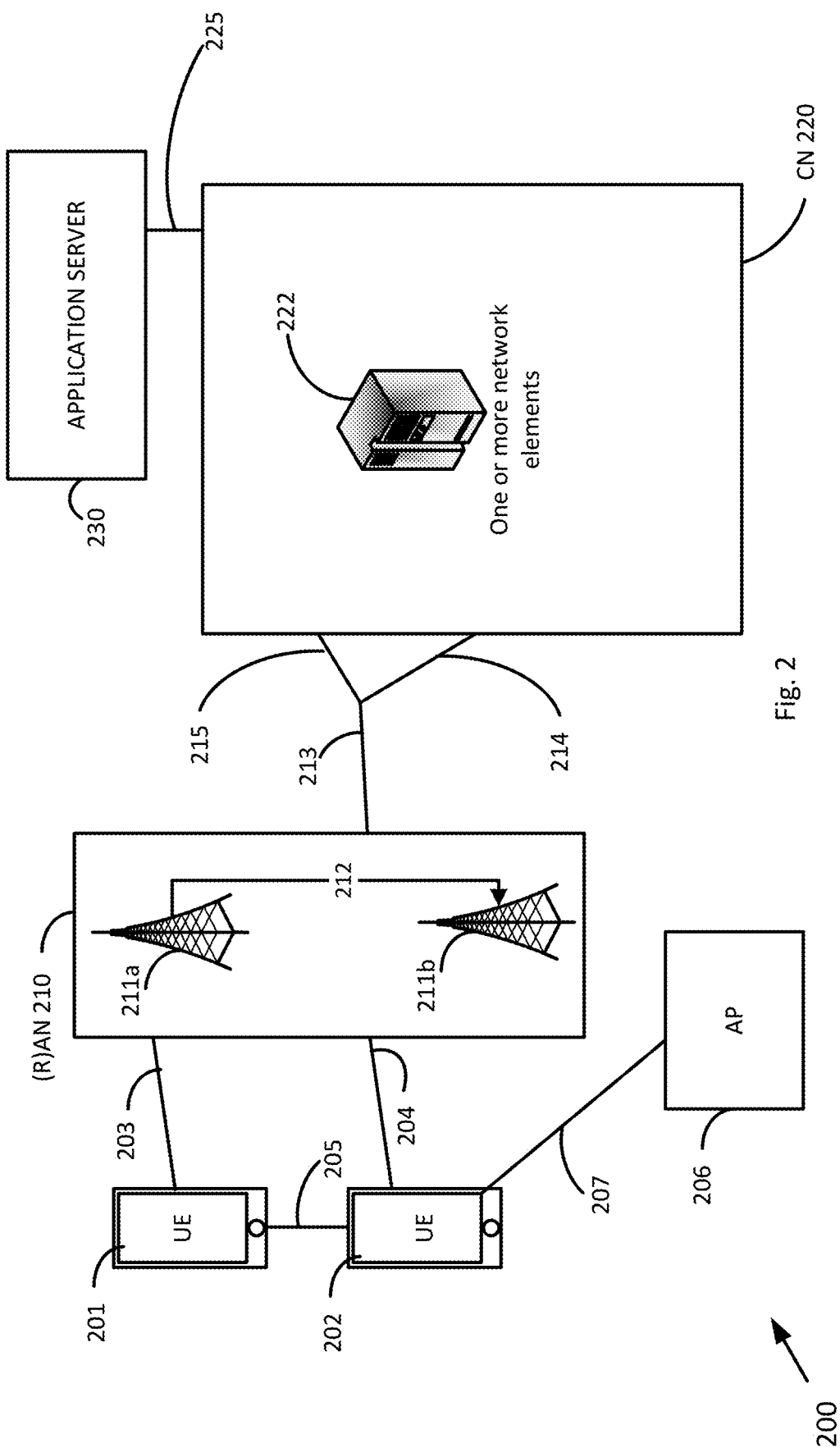
FIG. 2 is a schematic illustration of an architecture of a system, in accordance with some demonstrative embodiments.

Reference is made to FIG. 2, which schematically illustrates an architecture of a system 200, in accordance with some demonstrative embodiments. For example, one or more elements of system 100 (FIG. 1) may perform one or more operations of, one or more functionalities of, and/or the role of, one or more elements of system 200.

In one example, system 200 may operate in conjunction with the Long Term Evolution (LTE) system standards and the 5G or NR system standards as provided by 3GPP TS.

Some demonstrative embodiments are described herein with respect to a 5G or NR system. However, other embodiments may be implemented with respect to any other system, communication scheme, network, standard and/or protocol, for example, future 3GPP systems, e.g., Sixth Generation (6G)) systems, IEEE 802.16 protocols, e.g., Wireless metropolitan area networks (MAN), Worldwide Interoperability for Microwave Access (WiMAX), and the like, or any other additional or alternative system and/or network.

As shown by FIG. 2, the system 200 may include user equipment (UE) 201*a* and UE 201*b* (collectively referred to as "UEs 201" or "UE 201").

In one example, UE 102 (FIG. 1) may perform one or more operations of, one or more functionalities of, and/or the role of, UE 201a and/or UE 201b.

As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

In this example, UEs 201 are illustrated as smartphones (e.g., handheld touchscreen mobile computing devices connectable to one or more cellular networks), but may also include any mobile or non-mobile computing device, such as consumer electronics devices, cellular phones, smartphones, feature phones, tablet computers, wearable computer devices, Personal Digital Assistants (PDAs), pagers, wireless handsets, desktop computers, laptop computers, In-Vehicle Infotainment (IVI), in-car entertainment (ICE) devices, an Instrument Cluster (IC), Head-Up Display (HUD) devices, Onboard Diagnostic (OBD) devices, Dashtop Mobile Equipment (DME), mobile data terminals (MDTs), Electronic Engine Management System (EEMS), Electronic/Engine Control Units (ECUs), Electronic/Engine Control Modules (ECMs), embedded systems, microcontrollers, control modules, Engine Management Systems (EMS), networked or "smart" appliances, Machine-Type Communications (MTC) devices, Machine-To-Machine (M2M), Internet of Things (IoT) devices, and/or the like.

In some demonstrative embodiments, any of the UEs 201 may include an IoT UE, which may include a network access layer designed for low-power IoT applications utilizing short-lived UE connections. An IoT UE may utilize technologies such as M2M or MTC for exchanging data with an MTC server or device via a Public Land Mobile Network (PLMN), Proximity-Based Service (ProSe) or Device-To-Device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 201 may be configured to connect, for example, communicatively couple, with an Access Network (AN) or Radio Access Network (RAN) 210. In embodiments, the RAN 210 may be a next Generation (NG) RAN or a 5G RAN, an Evolved Universal Mobile Telecommunications System (UMTS) Terrestrial Radio Access Network (E-UTRAN), or a legacy RAN, such as a UTRAN (UMTS Terrestrial Radio Access Network) or GERAN (GSM (Global System for Mobile Communications or Groupe Special Mobile) EDGE (GSM Evolution) Radio Access Network). As used herein, the term "NG RAN" or the like may refer to a RAN 210 that operates in an NR or 5G system 200, and the term "E-UTRAN" or the like may refer to a RAN 210 that operates in an LTE or 4G system 200. The UEs 201 utilize connections (or channels) 203 and 204, respectively, each of which includes a physical communications interface or layer (discussed in further detail below). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

In one example, connections 104 (FIG. 1) may include connection 203 and/or connection 204.

In this example, the connections 203 and 204 are illustrated as an air interface to enable communicative coupling, and may be consistent with cellular communications protocols, such as a Global System for Mobile Communications (GSM) protocol, a Code-Division Multiple Access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and/or any of the other communications protocols discussed herein. In embodiments, the UEs 201 may directly exchange communication data via a ProSe interface 205. The ProSe interface 205 may alternatively be referred to as a sidelink (SL) interface 205 and may include one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 201b is shown to be configured to access an access point (AP) 206 (also referred to as also referred to as "WLAN node 206", "WLAN 206", "WLAN Termination 206" or "WT 206" or the like) via connection 207. The connection 207 may include a local wireless connection, such as a connection consistent with any IEEE 802.11 protocol, wherein the AP 206 would include a WiFi® router. In this example, the AP 206 is shown to be connected to the Internet without connecting to the core network of the wireless system (described in further detail below). In various embodiments, the UE 201b, RAN 210, and AP 206 may be configured to utilize LTE-WLAN aggregation (LWA) operation and/or WLAN LTE/WLAN Radio Level Integration with IPsec Tunnel (LWIP) operation. The LWA operation may involve the UE 201b in RRC_CONNECTED being configured by a RAN node 211 to utilize radio resources of LTE and WLAN. LWIP operation may involve the UE 201b using WLAN radio resources (e.g., connection 207) via Internet Protocol Security (IPsec) protocol tunneling to authenticate and encrypt packets (e.g., internet protocol (IP) packets) sent over the connection 207. IPsec tunneling may include encapsulating entirety of original IP packets and adding a new packet header thereby protecting the original header of the IP packets.

The RAN 210 may include one or more AN nodes or RAN nodes 211a and 211b (collectively referred to as "RAN nodes 211" or "RAN node 211") that enable the connections 203 and 204. As used herein, the terms "access node," "access point," or the like may describe equipment that provides the radio baseband functions for data and/or voice connectivity between a network and one or more users. These access nodes may be referred to as base stations (BS), next Generation NodeBs (gNBs), RAN nodes, evolved NodeBs (eNBs), NodeBs, Road Side Units (RSUs), Transmission Reception Points (TRxPs or TRPs), and so forth, and may include ground stations (e.g., terrestrial access points) or satellite stations providing coverage within a geographic area (e.g., a cell). The term "Road Side Unit" or "RSU" may refer to any transportation infrastructure entity implemented in or by an gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." As used herein, the term "NG RAN node" or the like may refer to a RAN node 211 that operates in an NR or 5G system 200 (for example a gNB), and the term "E-UTRAN node" or the like may refer to a RAN node 211 that operates in an LTE or 4G system 200 (e.g., an eNB). According to various embodiments, the RAN nodes 211 may be implemented as one or more of a dedicated physical device such as a macrocell base station, and/or a Low Power (LP) base station for providing femtocells, picocells or other like cells having smaller coverage areas, smaller user capacity, or higher bandwidth compared to macrocells. In other embodiments, the RAN nodes 211 may be implemented as one or more software entities running on server computers as part of a virtual network, which may be referred to as a cloud radio access network (CRAN). In other embodiments, the RAN nodes 211 may represent individual gNB-distributed units (DUs) that are connected to a gNB-centralized unit (CU) via an F1 interface (not shown by FIG. 2).

In one example, gNB 140 (FIG. 1) may perform one or more operations of, one or more functionalities of, and/or the role of, a RAN node of RAN nodes 211, RAN node 211*a*, and/or RAN node 211*b*.

Any of the RAN nodes 211 may terminate the air interface protocol and may be the first point of contact for the UEs 201. In some demonstrative embodiments, any of the RAN nodes 211 may fulfill various logical functions for the RAN 210 including, but not limited to, radio network controller (RNC) functions such as radio bearer management, uplink and downlink dynamic radio resource management and data packet scheduling, and mobility management.

In embodiments, the UEs 201 may be configured to communicate using Orthogonal Frequency-Division Multiplexing (OFDM) communication signals with each other or with any of the RAN nodes 211 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique, e.g., for uplink and ProSe or sidelink communications, although the scope of the embodiments is not limited in this respect. The OFDM signals may include a plurality of orthogonal subcarriers.

In some demonstrative embodiments, a downlink resource grid may be used for downlink transmissions from any of the RAN nodes 211 to the UEs 201, while uplink transmissions may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid includes a number of resource blocks, which describe the mapping of certain physical channels to resource elements. Each resource block includes a collection of resource elements; in the frequency domain, this may represent the smallest quantity of resources that currently may be allocated. There are several different physical downlink channels that are conveyed using such resource blocks.

According to various embodiments, the UEs 201, 202 and the RAN nodes 211, 212 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 201, 202 and the RAN nodes 211, 212 may operate using Licensed Assisted Access (LAA), enhanced LAA (eLAA), and/or further eLAA (feLAA) mechanisms. In these implementations, the UEs 201, 202 and the RAN nodes 211, 212 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 201, 202, RAN nodes 211, 212, etc.) senses a medium (for example, a channel or carrier frequency) and transmits when the medium is sensed to be idle (or when a specific channel in the medium is sensed to be unoccupied). The medium sensing operation may include clear channel assessment (CCA), which utilizes at least Energy Detection (ED) to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing radiofrequency (RF) energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called Carrier Sense Multiple Access with Collision Avoidance (CSMA/CA). Here, when a WLAN node (e.g., a mobile station (MS) such as UE 201 or 202, AP 206, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the Contention Window Size (CWS), which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y Extended CCA (ECCA) slots, where X and Y are minimum and maximum values for the CWSs for LAA. In one example, the minimum CWS for an LAA transmission may be 9 microseconds (µs); however, the size of the CWS and a Maximum Channel Occupancy Time (MCOT) (for example, a transmission burst) may be based on governmental regulatory requirements.

The LAA mechanisms are built upon Carrier Aggregation (CA) technologies of LTE-Advanced systems. In CA, each aggregated carrier is referred to as a Component Carrier (CC). A CC may have a bandwidth of 1.4, 3, 5, 10, 15 or 20 MHz and a maximum of five CCs may be aggregated, and therefore, a maximum aggregated bandwidth is 100 MHz. In Frequency Division Duplexing (FDD) systems, the number of aggregated carriers may be different for DL and UL, where the number of UL CCs is equal to or lower than the number of DL component carriers. In some cases, individual CCs may have a different bandwidth than other CCs. In Time Division Duplexing (TDD) systems, the number of CCs as well as the bandwidths of each CC is usually the same for DL and UL.

CA also includes individual serving cells to provide individual CCs. The coverage of the serving cells may differ, for example, due to that CCs on different frequency bands will experience different pathloss. A primary service cell or primary cell (PCell) may provide a Primary CC (PCC) for both UL and DL, and may handle Radio Resource Control (RRC) and Non-Access Stratum (NAS) related activities. The other serving cells are referred to as secondary cells (SCells), and each SCell may provide an individual Secondary CC (SCC) for both UL and DL. The SCCs may be added and removed as required, while changing the PCC may require the UE 201, 202 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different Physical Uplink Shared Channel (PUSCH) starting positions within a same subframe.

The Physical Downlink Shared Channel (PDSCH) may carry user data and higher-layer signaling to the UEs 201. The Physical Downlink Control Channel (PDCCH) may carry information about the transport format and resource allocations related to the PDSCH channel, among other things. It may also inform the UEs 201 about the transport format, resource allocation, and Hybrid Automatic Repeat Request (H-ARQ) information related to the uplink shared channel. Typically, downlink scheduling (assigning control and shared channel resource blocks to the UE 201b within a cell) may be performed at any of the RAN nodes 211 based on channel quality information fed back from any of the UEs 201. The downlink resource assignment information may be sent on the PDCCH used for (e.g., assigned to) each of the UEs 201.

The PDCCH may use Control Channel Elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH may be transmitted using one or more CCEs, depending on the size of the downlink control information (DCI) and the channel condition. There may be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more Enhanced the Control Channel Elements (ECCEs). Similar to above, each ECCE may correspond to nine sets of four physical resource elements known as an Enhanced Resource Element Groups (EREGs). An ECCE may have other numbers of EREGs in some situations.

The RAN nodes 211 may be configured to communicate with one another via interface 212. In embodiments where the system 200 is an LTE system, the interface 212 may be an X2 interface 212. The X2 interface may be defined between two or more RAN nodes 211 (e.g., two or more eNBs and the like) that connect to EPC 120, and/or between two eNBs connecting to EPC 120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a master eNB (MeNB) to a secondary eNB (SeNB); information about successful in sequence delivery of PDCP PDUs to a UE 201 from an SeNB for user data; information of PDCP PDUs that were not delivered to a UE 201; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 200 is a 5G or NR system, the interface 212 may be an Xn interface 212. The Xn interface is defined between two or more RAN nodes 211 (e.g., two or more gNBs and the like) that connect to 5GC 220, between a RAN node 211 (e.g., a gNB) connecting to 5GC 220 and an eNB, and/or between two eNBs connecting to 5GC 220. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 201 in a connected mode (e.g., CM-CONNECTED) including functionality to manage the UE mobility for connected mode between one or more RAN nodes 211. The mobility support may include context transfer from an old (source) serving RAN node 211 to new (target) serving RAN node 211; and control of user plane tunnels between old (source) serving RAN node 211 to new (target) serving RAN node 211. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 210 is shown to be communicatively coupled to a core network 220 in this embodiment, Core Network (CN) 220. The CN 220 may include a plurality of network elements 222, which are configured to offer various data and telecommunications services to customers/subscribers (e.g., users of UEs 201) who are connected to the CN 220 via the RAN 210. The term "network element" may describe a physical or virtualized equipment used to provide wired or wireless communication network services. The term "network element" may be considered synonymous to and/or referred to as a networked computer, networking hardware, network equipment, router, switch, hub, bridge, radio network controller, radio access network device, gateway, server, virtualized network function (VNF), Network Functions Virtualization Infrastructure (NFVI), and/or the like. The components of the CN 220 may be implemented in one physical node or separate physical nodes including components to read and execute instructions from a machine-readable or computer-readable medium (e.g., a non-transitory machine-readable storage medium). In some demonstrative embodiments, Network Functions Virtualization (NFV) may be utilized to virtualize any or all of the above described network node functions via executable instructions stored in one or more computer readable storage mediums (described in further detail below). A logical instantiation of the CN 220 may be referred to as a network slice, and a logical instantiation of a portion of the CN 220 may be referred to as a network sub-slice. NFV architectures and infrastructures may be used to virtualize one or more network functions, alternatively performed by proprietary hardware, onto physical resources including a combination of industry-standard server hardware, storage hardware, or switches. In other words, NFV systems may be used to execute virtual or reconfigurable implementations of one or more EPC components/functions.

Generally, the application server 230 may be an element offering applications that use IP bearer resources with the core network (e.g., UMTS Packet Services (PS) domain, LTE PS data services, etc.). The application server 230 may also be configured to support one or more communication services (e.g., Voice-over-Internet Protocol (VoIP) sessions, PTT sessions, group communication sessions, social networking services, etc.) for the UEs 201 via the EPC 220.

In embodiments, the CN 220 may be a 5GC (referred to as "5GC 220" or the like), and the RAN 210 may be connected with the CN 220 via an NG interface 213. In embodiments, the NG interface 213 may be split into two parts, an NG user plane (NG-U) interface 214, which carries traffic data between the RAN nodes 211 and a user plane function (UPF), and the S1 control plane (NG-C) interface 215, which is a signaling interface between the RAN nodes 211 and Access and Mobility Functions (AMFs). In embodiments, the CN 220 may be a 5G CN (referred to as "5GC 220" or the like), while in other embodiments, the CN 220 may be an Evolved Packet Core (EPC)). Where CN 220 is an EPC (referred to as "EPC 220" or the like), the RAN 210 may be connected with the CN 220 via an S1 interface 213. In embodiments, the S1 interface 23 may be split into two parts, an S1 user plane (S1-U) interface 214, which carries traffic data between the RAN nodes 211 and the serving gateway (S-GW), and the S1-Mobility Management Entity (MME) interface 215, which is a signaling interface between the RAN nodes 211 and MMEs.

Figure 3:
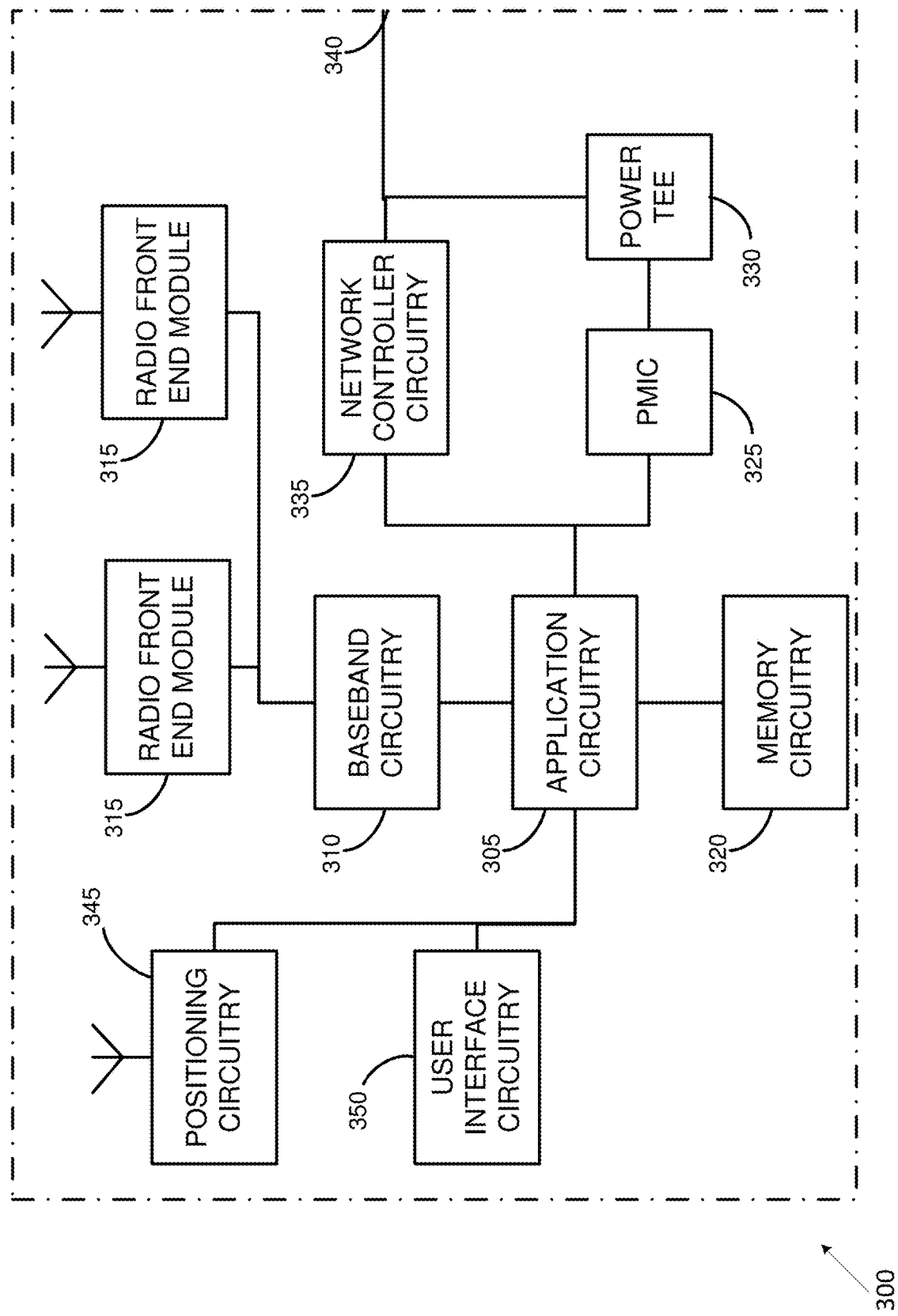
FIG. 3 is a schematic illustration of an infrastructure equipment, in accordance with some demonstrative embodiments.

Reference is made to FIG. 3, which schematically illustrates an infrastructure equipment 300, in accordance with some demonstrative embodiments.

In one example, the infrastructure equipment 300 (or "system 300") may be implemented as a base station, radio head, RAN node, etc., such as the RAN nodes 211 and/or AP 206 (FIG. 2) shown and described previously. For example, gNB 140 (FIG. 1) may include some or all components and/or elements of infrastructure equipment 300.

In other example, the system 300 could be implemented in or by a UE, application server(s) 230, and/or any other element/device discussed herein.

The system 300 may include one or more of application circuitry 305, baseband circuitry 310, one or more radio front end modules 315, memory 320, power management integrated circuitry (PMIC) 325, power tee circuitry 330, network controller 335, network interface connector 340, satellite positioning circuitry 345, and user interface 350. In some demonstrative embodiments, the device 300 may include additional elements such as, for example, memory/storage, display, camera, sensor, or Input/Output (I/O) interface. In other embodiments, the components described below may be included in more than one device (e.g., the circuitries may be separately included in more than one device for Cloud-RAN (C-RAN) implementations).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a Field-Programmable Device (FPD), (e.g., a Field-Programmable Gate Array (FPGA), a Programmable Logic Device (PLD), a complex PLD (CPLD), a high-capacity PLD (HCPLD), a structured ASIC, or a programmable System on Chip (SoC)), digital signal processors (DSPs), etc., that are configured to provide the described functionality. In some demonstrative embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as "processor circuitry." As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, and a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Furthermore, the various components of the core network 220 (FIG. 2) may be referred to as "network elements." The term "network element" may describe a physical or virtualized equipment used to provide wired or wireless communication network services. The term "network element" may be considered synonymous to and/or referred to as a networked computer, networking hardware, network equipment, network node, router, switch, hub, bridge, radio network controller, radio access network device, gateway, server, virtualized network function (VNF), network functions virtualization infrastructure (NFVI), and/or the like.

Application circuitry 305 may include one or more central processing unit (CPU) cores and one or more of cache memory, Low Drop-Out voltage regulators (LDOs), interrupt controllers, serial interfaces such as SPI, I2C or universal programmable serial interface module, Real Time Clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 305 may include one or more Intel Pentium®, Core®, or Xeon® processor(s); Advanced Micro Devices (AMD) Ryzen® processor(s), Accelerated Processing Units (APUs), or Epyc® processors; and/or the like. In some demonstrative embodiments, the system 300 may not utilize application circuitry 305, and instead may include a special-purpose processor/controller to process IP data received from an EPC or SGC, for example.

Additionally or alternatively, application circuitry 305 may include circuitry such as, but not limited to, one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 305 may include logic blocks or logic fabric including and other interconnected resources that may be programmed to perform various functions, such as the procedures, methods, functions, etc. of the various embodiments discussed herein. In such embodiments, the circuitry of application circuitry 305 may include memory cells (e.g., erasable programmable read-only memory (EPROM), Electrically Erasable Programmable Read-Only Memory (EEPROM), flash memory, static memory (e.g., Static Random Access Memory (SRAM), anti-fuses, etc.) used to store logic blocks, logic fabric, data, etc. in Lookup-Tables (LUTs) and the like.

The baseband circuitry 310 may be implemented, for example, as a solder-down substrate including one or more integrated circuits, a single packaged integrated circuit soldered to a main circuit board or a multi-chip module containing two or more integrated circuits. Although not shown, baseband circuitry 310 may include one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, Network-On-Chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 310 may include protocol processing circuitry with one or more instances of control circuitry (not shown) to provide control functions for the digital baseband circuitry and/or radio frequency circuitry (e.g., the radio front end modules 315).

User interface circuitry 350 may include one or more user interfaces designed to enable user interaction with the system 300 or peripheral component interfaces designed to enable peripheral component interaction with the system 300. User interfaces may include, but are not limited to one or more physical or virtual buttons (e.g., a reset button), one or more indicators (e.g., Light Emitting Diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

The Radio Front End Modules (RFEMs) 315 may include a millimeter wave RFEM and one or more sub-millimeter wave Radio Frequency Integrated Circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 315. The RFEMs 315 may incorporate both millimeter wave antennas and sub-millimeter wave antennas.

The memory circuitry 320 may include one or more of volatile memory including Dynamic Random Access Memory (DRAM) and/or synchronous dynamic random access memory (SDRAM), and Nonvolatile Memory (NVM) including high-speed electrically erasable memory (commonly referred to as Flash memory), Phase Change Random Access Memory (PRAM), Magnetoresistive Random Access Memory (MRAM), etc., and may incorporate the three-dimensional (3D) cross-point (XPOINT) memories from Intel® and Micron®. Memory circuitry 320 may be implemented as one or more of solder down packaged integrated circuits, socketed memory modules and plug-in memory cards.

The PMIC 325 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 330 may provide for electrical power drawn from a network cable to provide both power supply and data connectivity to the infrastructure equipment 300 using a single cable.

The network controller circuitry 335 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 300 via network interface connector 340 using a physical connection, which may be electrical (commonly referred to as a "copper interconnect"), optical, or wireless. The network controller circuitry 335 may include one or more dedicated processors and/or FPGAs to communicate using one or more of the aforementioned protocols. In some implementations, the network controller circuitry 335 may include multiple controllers to provide connectivity to other networks using the same or different protocols.

The positioning circuitry 345, which may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 345 may include various hardware elements (e.g., including hardware devices such as switches, filters, amplifiers, antenna elements, and the like to facilitate the communications over-the-air (OTA) communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry 345 and/or positioning circuitry implemented by UEs 201, 202, or the like) to determine their GNSS position. The GNSS signals may include a pseudorandom code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some demonstrative embodiments, the positioning circuitry 345 may include a Micro-Technology for Positioning, Navigation, and Timing (Micro-PNT) IC that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine ToF values for each received GNSS signal from the ToAs and the ToTs, and then may determine, from the ToFs, a three-dimensional (3D) position and clock deviation. The 3D position may then be converted into a latitude, longitude and altitude. The positioning circuitry 345 may provide data to application circuitry 305 which may include one or more of position data or time data. Application circuitry 305 may use the time data to synchronize operations with other radio base stations (e.g., RAN nodes 211 or the like).

The components shown by FIG. 3 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, Input/Output (I/O) interfaces, peripheral component interfaces, network interface cards, and/or the like. Any suitable bus technology may be used in various implementations, which may include any number of technologies, including Industry Standard Architecture (ISA), Extended ISA (EISA), Peripheral Component Interconnect (PCI), Peripheral Component Interconnect Extended (PCIx), PCI express (PCIe), or any number of other technologies. The bus may be a proprietary bus, for example, used in a SoC based system. Other bus systems may be included, such as an I2C interface, an SPI interface, point to point interfaces, and a power bus, among others.

Figure 4:
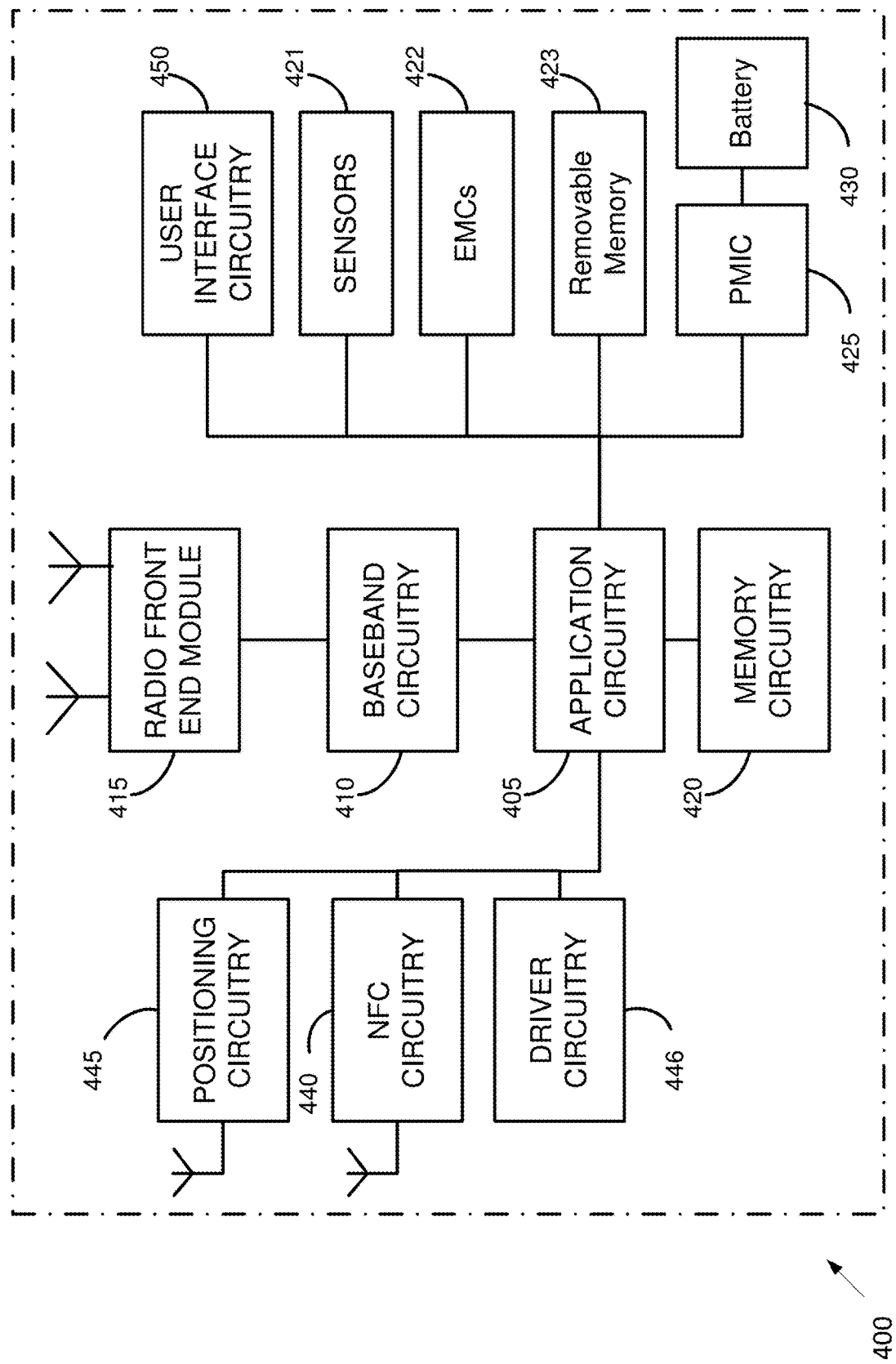
FIG. 4 is a schematic illustration of a platform, in accordance with some demonstrative embodiments.

Reference is made to FIG. 4, which schematically illustrates elements of a platform 400, in accordance with some demonstrative embodiments.

In one example, one or more elements of platform 400 may be configured to perform one or more functionalities of one or more of radio 114 (FIG. 1), controller 128 (FIG. 1), message processor 128 (FIG. 1), and/or one or more other elements of UE 102 (FIG. 1).

In one example, device 400 may be suitable for use as UEs 201, 202, application servers 230, (FIG. 2) and/or any other element/device discussed herein. The platform 400 may include any combinations of the components shown in the example. The components of platform 400 may be implemented as Integrated Circuits (ICs), portions thereof, discrete electronic devices, or other modules, logic, hardware, software, firmware, or a combination thereof adapted in the computer platform 400, or as components otherwise incorporated within a chassis of a larger system. The block diagram of FIG. 4 is intended to show a high level view of components of the computer platform 400. However, some of the components shown may be omitted, additional components may be present, and different arrangement of the components shown may occur in other implementations.

The application circuitry 405 may include circuitry such as, but not limited to single-core or multi-core processors and one or more of cache memory, Low Drop-Out Voltage Regulators (LDOs), interrupt controllers, serial interfaces such as serial peripheral interface (SPI), Inter-Integrated Circuit (I2C) or universal programmable serial interface circuit, Real Time Clock (RTC), timer-counters including interval and watchdog timers, general purpose input-output (IO), memory card controllers such as Secure Digital/Multi-Media Card (SD/MMC) or similar, Universal Serial Bus (USB) interfaces, mobile industry processor interface (MIPI) interfaces and Joint Test Access Group (JTAG) test access ports. The processor(s) may include any combination of general-purpose processors and/or dedicated processors (e.g., graphics processors, application processors, etc.). The processors (or cores) may be coupled with or may include memory/storage and may be configured to execute instructions stored in the memory/storage to enable various applications or operating systems to run on the platform 400. In some demonstrative embodiments, processors of application circuitry 305/405 may process IP data packets received from an EPC or SGC.

Application circuitry 405 be or include a microprocessor, a multi-core processor, a multithreaded processor, an ultra-low voltage processor, an embedded processor, or other known processing element. In one example, the application circuitry 405 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 405 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc; an ARM-based design licensed from ARM Holdings, Ltd.; or the like. In some implementations, the application circuitry 405 may be a part of a system on a chip (SoC) in which the application circuitry 405 and other components are formed into a single integrated circuit, or a single package, such as the Edison™ or Galileo™ SoC boards from Intel® Corporation.

Additionally or alternatively, application circuitry 405 may include circuitry such as, but not limited to, one or more a Field-Programmable Devices (FPDs) such as FPGAs and the like; Programmable Logic Devices (PLDs) such as complex PLDs (CPLDs), High-Capacity PLDs (HCPLDs), and the like; ASICs such as structured ASICs and the like; programmable SoCs (PSoCs); and the like. In such embodiments, the circuitry of application circuitry 405 may include logic blocks or logic fabric including and other interconnected resources that may be programmed to perform various functions, such as the procedures, methods, functions, etc. of the various embodiments discussed herein. In such embodiments, the circuitry of application circuitry 405 may include memory cells (e.g., erasable programmable read-only memory (EPROM), Electrically Erasable Programmable Read-Only Memory (EEPROM), flash memory, static memory (e.g., Static Random Access Memory (SRAM), anti-fuses, etc.) used to store logic blocks, logic fabric, data, etc. in Lookup-Tables (LUTs) and the like.

The baseband circuitry 410 may be implemented, for example, as a solder-down substrate including one or more integrated circuits, a single packaged integrated circuit soldered to a main circuit board or a multi-chip module containing two or more integrated circuits. Although not shown, baseband circuitry 410 may include one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, Network-On-Chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 410 may include protocol processing circuitry with one or more instances of control circuitry (not shown) to provide control functions for the digital baseband circuitry and/or radio frequency circuitry (e.g., the radio front end modules 415).

The Radio Front End Modules (RFEMs) 415 may include a millimeter wave RFEM and one or more sub-millimeter wave Radio Frequency Integrated Circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 415. The RFEMs 415 may incorporate both millimeter wave antennas and sub-millimeter wave antennas.

The memory circuitry 420 may include any number and type of memory devices used to provide for a given amount of system memory. As examples, the memory circuitry 420 may include one or more of volatile memory including be Random Access Memory (RAM), dynamic RAM (DRAM) and/or Synchronous Dynamic RAM (SDRAM), and non-volatile memory (NVM) including high-speed electrically erasable memory (commonly referred to as Flash memory), phase change random access memory (PRAM), Magnetoresistive Random Access Memory (MRAM), etc. The memory circuitry 420 may be developed in accordance with a JOINT ELECTRON DEVICES ENGINEERING COUNCIL (JEDEC) low power double data rate (LPDDR)-based design, such as LPDDR2, LPDDR3, LPDDR4, or the like. Memory circuitry 420 may be implemented as one or more of solder down packaged integrated circuits, Single Die Package (SDP), Dual Die Package (DDP) or Quad Die Package (Q17P), socketed memory modules, Dual Inline Memory Modules (DIMMs) including microDIMMs or MiniDIMMs, and/or soldered onto a motherboard via a Ball Grid Array (BGA). In low power implementations, the memory circuitry 420 may be on-die memory or registers associated with the application circuitry 405. To provide for persistent storage of information such as data, applications, operating systems and so forth, memory circuitry 420 may include one or more mass storage devices, which may include, inter alia, a solid state disk drive (SSDD), Hard Disk Drive (HDD), a micro HDD, resistance change memories, phase change memories, holographic memories, or chemical memories, among others. For example, the computer platform 400 may incorporate the Three-Dimensional (3D) cross-point (XPOINT) memories from Intel® and Micron®.

Removable memory circuitry 423 may include devices, circuitry, enclosures/housings, ports or receptacles, etc. used to coupled portable data storage devices with the platform 400. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 400 may also include interface circuitry (not shown) that is used to connect external devices with the platform 400. The external devices connected to the platform 400 via the interface circuitry may include sensors 421, such as accelerometers, level sensors, flow sensors, temperature sensors, pressure sensors, barometric pressure sensors, and the like. The interface circuitry may be used to connect the platform 400 to electro-mechanical components (EMCs) 422, which may allow platform 400 to change its state, position, and/or orientation, or move or control a mechanism or system. The EMCs 422 may include one or more power switches, relays including Electromechanical Relays (EMRs) and/or Solid State Relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 400 may be configured to operate one or more EMCs 422 based on one or more captured events and/or instructions or control signals received from a service provider and/or various clients.

In some implementations, the interface circuitry may connect the platform 400 with positioning circuitry 445, which may be the same or similar as the positioning circuitry 345 discussed with regard to FIG. 3.

In some implementations, the interface circuitry may connect the platform 400 with near-field communication (NFC) circuitry 440, which may include an NFC controller coupled with an antenna element and a processing device. The NFC circuitry 440 may be configured to read electronic tags and/or connect with another NFC-enabled device.

The driver circuitry 446 may include software and hardware elements that operate to control particular devices that are embedded in the platform 400, attached to the platform 400, or otherwise communicatively coupled with the platform 400. The driver circuitry 446 may include individual drivers allowing other components of the platform 400 to interact or control various input/output (I/O) devices that may be present within, or connected to, the platform 400. For example, driver circuitry 446 may include a display driver to control and allow access to a display device, a touchscreen driver to control and allow access to a touchscreen interface of the platform 400, sensor drivers to obtain sensor readings of sensors 421 and control and allow access to sensors 421, EMC drivers to obtain actuator positions of the EMCs 422 and/or control and allow access to the EMCs 422, a camera driver to control and allow access to an embedded image capture device, audio drivers to control and allow access to one or more audio devices.

The power management integrated circuitry (PMIC) 425 (also referred to as "power management circuitry 425") may manage power provided to various components of the platform 400. In particular, with respect to the baseband circuitry 410, the PMIC 425 may control power-source selection, voltage scaling, battery charging, or DC-to-DC conversion. The PMIC 425 may often be included when the platform 400 is capable of being powered by a battery 430, for example, when the device is included in a UE 201, 202.

In some demonstrative embodiments, the PMIC 425 may control, or otherwise be part of, various power saving mechanisms of the platform 400. For example, if the platform 400 is in an RRC_Connected state, where it is still connected to the RAN node as it expects to receive traffic shortly, then it may enter a state known as Discontinuous Reception Mode (DRX) after a period of inactivity. During this state, the platform 400 may power down for brief intervals of time and thus save power. If there is no data traffic activity for an extended period of time, then the platform 400 may transition off to an RRC_Idle state, where it disconnects from the network and does not perform operations such as channel quality feedback, handover, etc. The platform 400 goes into a very low power state and it performs paging where again it periodically wakes up to listen to the network and then powers down again. The platform 400 may not receive data in this state, in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 430 may power the platform 400, although in some examples the platform 400 may be mounted deployed in a fixed location, and may have a power supply coupled to an electrical grid. The battery 430 may be a lithium ion battery, a metal-air battery, such as a zinc-air battery, an aluminum-air battery, a lithium-air battery, and the like. In some implementations, such as in V2X applications, the battery 430 may be a typical lead-acid automotive battery.

In some implementations, the battery 430 may be a "smart battery," which includes or is coupled with a Battery Management System (BMS) or battery monitoring integrated circuitry. The BMS may be included in the platform 400 to track the state of charge (SoCh) of the battery 430. The BMS may be used to monitor other parameters of the battery 430 to provide failure predictions, such as the State Of Health (SoH) and the State Of Function (SoF) of the battery 430. The BMS may communicate the information of the battery 430 to the application circuitry 405 or other components of the platform 400. The BMS may also include an Analog-To-Digital Convertor (ADC) that allows the application circuitry 405 to directly monitor the voltage of the battery 430 or the current flow from the battery 430. The battery parameters may be used to determine actions that the platform 400 may perform, such as transmission frequency, network operation, sensing frequency, and the like.

A power block, or other power supply coupled to an electrical grid may be coupled with the BMS to charge the battery 430. In some examples, the power block 228 may be replaced with a wireless power receiver to obtain the power wirelessly, for example, through a loop antenna in the computer platform 400. In these examples, a wireless battery charging circuit may be included in the BMS. The specific charging circuits chosen may depend on the size of the battery 430, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Although not shown, the components of platform 400 may communicate with one another using a suitable bus technology, which may include any number of technologies, including industry standard architecture (ISA), extended ISA (EISA), peripheral component interconnect (PCI), Peripheral Component Interconnect Extended (PCIx), PCI express (PCIe), a Time-Trigger Protocol (TTP) system, or a FlexRay system, or any number of other technologies. The bus may be a proprietary bus, for example, used in a SoC based system. Other bus systems may be included, such as an I2C interface, an SPI interface, point to point interfaces, and a power bus, among others.

Figure 5:
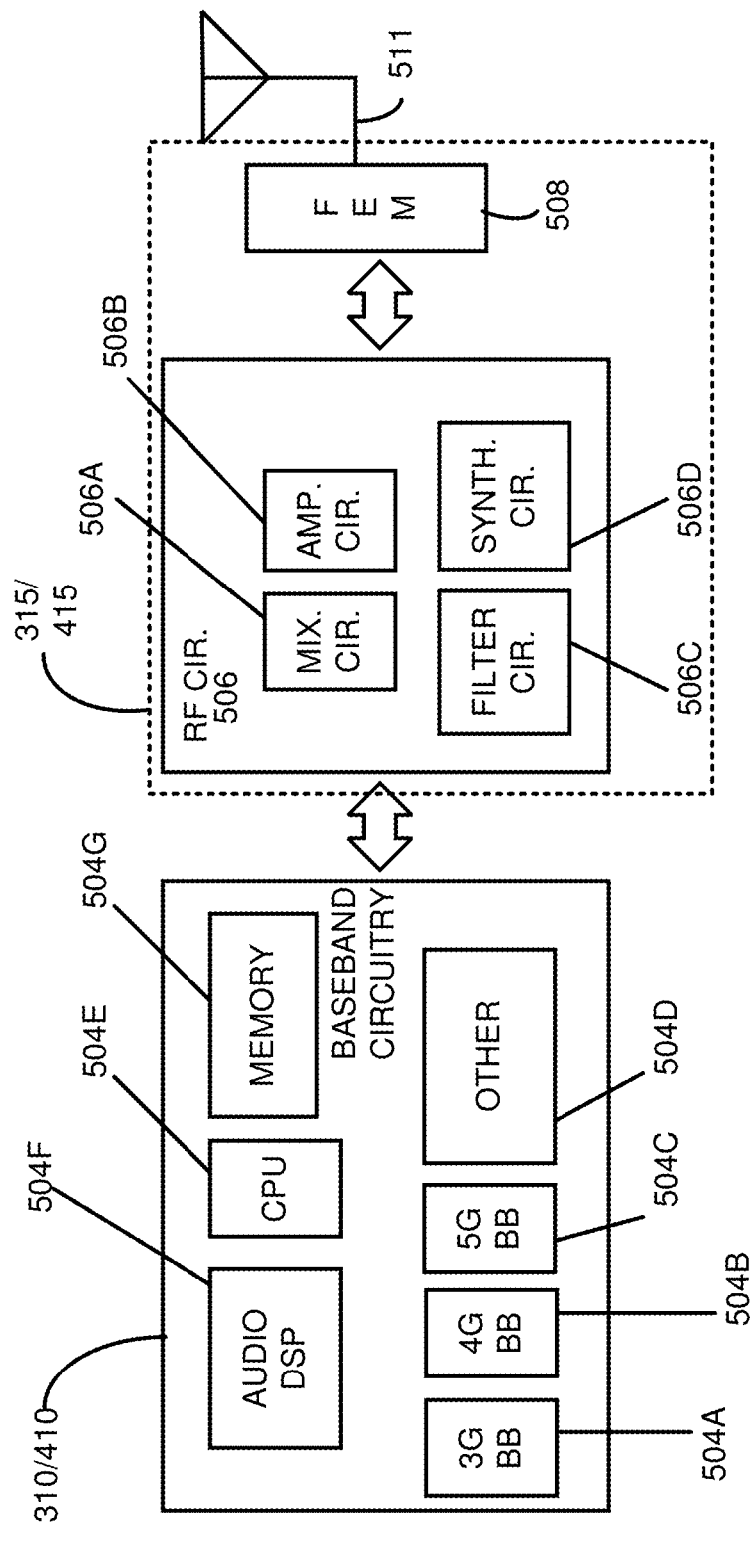
FIG. 5 is a schematic illustration of a baseband and Radio Frequency (RF) configuration, in accordance with some demonstrative embodiments.

Reference is made to FIG. 5, which schematically illustrates a baseband and Radio Frequency (RF) configuration 500, in accordance with some demonstrative embodiments.

In one example, UE 102 (FIG. 1) and/or gNB 140 (FIG. 1), may include one or more elements of RF/baseband configuration 500.

In one example, the elements and/or components of configuration 500 may be included as part of baseband circuitry 310 (FIG. 3) and/or 410 (FIG. 4) and/or radio front end modules (RFEM) 315 (FIG. 3) and/or 415 (FIG. 4).

As shown, the RFEM 315/415 may include Radio Frequency (RF) circuitry 506, front-end module (FEM) circuitry 508, one or more antennas 511 coupled together at least as shown.

The baseband circuitry 310 (FIG. 3) and/or 410 (FIG. 4) may include circuitry such as, but not limited to, one or more single-core or multi-core processors. The baseband circuitry 310 (FIG. 3) and/or 410 (FIG. 4) may include one or more baseband processors or control logic to process baseband signals received from a receive signal path of the RF circuitry 506 and to generate baseband signals for a transmit signal path of the RF circuitry 506. Baseband processing circuitry 310 (FIG. 3) and/or 410 (FIG. 4) may interface with the application circuitry 305/405 for generation and processing of the baseband signals and for controlling operations of the RF circuitry 506. For example, in some embodiments, the baseband circuitry 310 (FIG. 3) and/or 410 (FIG. 4) may include a third generation (3G) baseband processor 504A, a fourth generation (4G) baseband processor 504B, a fifth generation (5G) baseband processor 504C, or other baseband processor(s) 504D for other existing generations, generations in development or to be developed in the future (e.g., second generation (2G), sixth generation (6G), etc.). The baseband circuitry 310 (FIG. 3) and/or 410 (FIG. 4) (e.g., one or more of baseband processors 504A-D) may handle various radio control functions that enable communication with one or more radio networks via the RF circuitry 506. In other embodiments, some or all of the functionality of baseband processors 504A-D may be included in modules stored in the memory 504G and executed via a Central Processing Unit (CPU) 504E. The radio control functions may include, but are not limited to, signal modulation/demodulation, encoding/decoding, radio frequency shifting, etc. In some demonstrative embodiments, modulation/demodulation circuitry of the baseband circuitry 310 (FIG. 3) and/or 410 (FIG. 4) may include Fast-Fourier Transform (FFT), precoding, or constellation mapping/demapping functionality. In some demonstrative embodiments, encoding/decoding circuitry of the baseband circuitry 310 (FIG. 3) and/or 410 (FIG. 4) may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some demonstrative embodiments, the baseband circuitry 310 (FIG. 3) and/or 410 (FIG. 4) may include one or more audio Digital Signal Processors) (DSP) 504F. The audio DSP(s) 504F may be include elements for compression/decompression and echo cancellation and may include other suitable processing elements in other embodiments. Components of the baseband circuitry may be suitably combined in a single chip, a single chipset, or disposed on a same circuit board in some embodiments. In some demonstrative embodiments, some or all of the constituent components of the baseband circuitry 310 (FIG. 3) and/or 410 (FIG. 4) and the application circuitry 305/405 may be implemented together such as, for example, on a system on a chip (SOC).

In some demonstrative embodiments, the baseband circuitry 310 (FIG. 3) and/or 410 (FIG. 4) may provide for communication compatible with one or more radio technologies. For example, in some embodiments, the baseband circuitry 310 (FIG. 3) and/or 410 (FIG. 4) may support communication with an evolved universal terrestrial radio access network (EUTRAN) or other Wireless Metropolitan Area Networks (WMAN), a Wireless Local Area Network (WLAN), a Wireless Personal Area Network (WPAN). Embodiments in which the baseband circuitry 310 (FIG. 3) and/or 410 (FIG. 4) is configured to support radio communications of more than one wireless protocol may be referred to as multi-mode baseband circuitry.

RF circuitry 506 may enable communication with wireless networks using modulated electromagnetic radiation through a non-solid medium. In various embodiments, the RF circuitry 506 may include switches, filters, amplifiers, etc. to facilitate the communication with the wireless network. RF circuitry 506 may include a receive signal path which may include circuitry to down-convert RF signals received from the FEM circuitry 508 and provide baseband signals to the baseband circuitry 310 (FIG. 3) and/or 410 (FIG. 4). RF circuitry 506 may also include a transmit signal path which may include circuitry to up-convert baseband signals provided by the baseband circuitry 310 (FIG. 3) and/or 410 (FIG. 4) and provide RF output signals to the FEM circuitry 508 for transmission.

In some demonstrative embodiments, the receive signal path of the RF circuitry 506 may include mixer circuitry 506a, amplifier circuitry 506b and filter circuitry 506c. In some demonstrative embodiments, the transmit signal path of the RF circuitry 506 may include filter circuitry 506c and mixer circuitry 506a. RF circuitry 506 may also include synthesizer circuitry 506d for synthesizing a frequency for use by the mixer circuitry 506a of the receive signal path and the transmit signal path. In some demonstrative embodiments, the mixer circuitry 506a of the receive signal path may be configured to down-convert RF signals received from the FEM circuitry 508 based on the synthesized frequency provided by synthesizer circuitry 506d. The amplifier circuitry 506b may be configured to amplify the down-converted signals and the filter circuitry 506c may be a Low-Pass Filter (LPF) or Band-Pass Filter (BPF) configured to remove unwanted signals from the down-converted signals to generate output baseband signals. Output baseband signals may be provided to the baseband circuitry 310 (FIG. 3) and/or 410 (FIG. 4) for further processing. In some demonstrative embodiments, the output baseband signals may be zero-frequency baseband signals, although this is not a requirement. In some demonstrative embodiments, mixer circuitry 506a of the receive signal path may include passive mixers, although the scope of the embodiments is not limited in this respect.

In some demonstrative embodiments, the mixer circuitry 506a of the transmit signal path may be configured to up-convert input baseband signals based on the synthesized frequency provided by the synthesizer circuitry 506d to generate RF output signals for the FEM circuitry 508. The baseband signals may be provided by the baseband circuitry 310 (FIG. 3) and/or 410 (FIG. 4) and may be filtered by filter circuitry 506c.

In some demonstrative embodiments, the mixer circuitry 506a of the receive signal path and the mixer circuitry 506a of the transmit signal path may include two or more mixers and may be arranged for quadrature downconversion and upconversion, respectively. In some demonstrative embodiments, the mixer circuitry 506a of the receive signal path and the mixer circuitry 506a of the transmit signal path may include two or more mixers and may be arranged for image rejection (e.g., Hartley image rejection). In some demonstrative embodiments, the mixer circuitry 506a of the receive signal path and the mixer circuitry 506a may be arranged for direct downconversion and direct upconversion, respectively. In some demonstrative embodiments, the mixer circuitry 506a of the receive signal path and the mixer circuitry 506a of the transmit signal path may be configured for super-heterodyne operation.

In some demonstrative embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 506 may include Analog-To-Digital Converter (ADC) and Digital-To-Analog Converter (DAC) circuitry and the baseband circuitry 310 (FIG. 3) and/or 410

(FIG. 4) may include a digital baseband interface to communicate with the RF circuitry 506.

In some dual-mode embodiments, a separate radio IC circuitry may be provided for processing signals for each spectrum, although the scope of the embodiments is not limited in this respect.

In some demonstrative embodiments, the synthesizer circuitry 506d may be a fractional-N synthesizer or a fractional N/N+1 synthesizer, although the scope of the embodiments is not limited in this respect as other types of frequency synthesizers may be suitable. For example, synthesizer circuitry 506d may be a delta-sigma synthesizer, a frequency multiplier, or a synthesizer including a phase-locked loop with a frequency divider.

The synthesizer circuitry 506d may be configured to synthesize an output frequency for use by the mixer circuitry 506a of the RF circuitry 506 based on a frequency input and a divider control input. In some demonstrative embodiments, the synthesizer circuitry 506d may be a fractional N/N+1 synthesizer.

In some demonstrative embodiments, frequency input may be provided by a Voltage Controlled Oscillator (VCO), although that is not a requirement. Divider control input may be provided by either the baseband circuitry 310 (FIG. 3) and/or 410 (FIG. 4) or the applications processor 305/405 depending on the desired output frequency. In some demonstrative embodiments, a divider control input (e.g., N) may be determined from a look-up table based on a channel indicated by the applications processor 305/405.

Synthesizer circuitry 506d of the RF circuitry 506 may include a divider, a delay-locked loop (DLL), a multiplexer and a phase accumulator. In some demonstrative embodiments, the divider may be a Dual Modulus Divider (DMD) and the phase accumulator may be a Digital Phase Accumulator (DPA). In some demonstrative embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some demonstrative embodiments, synthesizer circuitry 506d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some demonstrative embodiments, the output frequency may be a LO frequency (fLO). In some demonstrative embodiments, the RF circuitry 506 may include an IQ/polar converter.

FEM circuitry 508 may include a receive signal path which may include circuitry configured to operate on RF signals received from one or more antennas 511, amplify the received signals and provide the amplified versions of the received signals to the RF circuitry 506 for further processing. FEM circuitry 508 may also include a transmit signal path which may include circuitry configured to amplify signals for transmission provided by the RF circuitry 506 for transmission by one or more of the one or more antennas 511. In various embodiments, the amplification through the transmit or receive signal paths may be done solely in the RF circuitry 506, solely in the FEM 508, or in both the RF circuitry 506 and the FEM 508.

In some demonstrative embodiments, the FEM circuitry 508 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 506). The transmit signal path of the FEM circuitry 508 may include a power amplifier (PA) to amplify input RF signals (e.g., provided by RF circuitry 506), and one or more filters to generate RF signals for subsequent transmission (e.g., by one or more of the one or more antennas 511).

Processors of the application circuitry 305/405 and processors of the baseband circuitry 310 (FIG. 3) and/or 410 (FIG. 4) may be used to execute elements of one or more instances of a protocol stack. For example, processors of the baseband circuitry 310 (FIG. 3) and/or 410 (FIG. 4), alone or in combination, may be used execute Layer 3, Layer 2, or Layer 1 functionality, while processors of the baseband circuitry 310 (FIG. 3) and/or 410 (FIG. 4) may utilize data (e.g., packet data) received from these layers and further execute Layer 4 functionality (e.g., transmission communication protocol (TCP) and user datagram protocol (UDP) layers). As referred to herein, Layer 3 may include a radio resource control (RRC) layer, described in further detail below. As referred to herein, Layer 2 may include a Medium Access Control (MAC) layer, a Radio Link Control (RLC) layer, and a Packet Data Convergence Protocol (PDCP) layer, described in further detail below. As referred to herein, Layer 1 may include a physical (PHY) layer of a UE/RAN node, described in further detail below.

Figure 6:
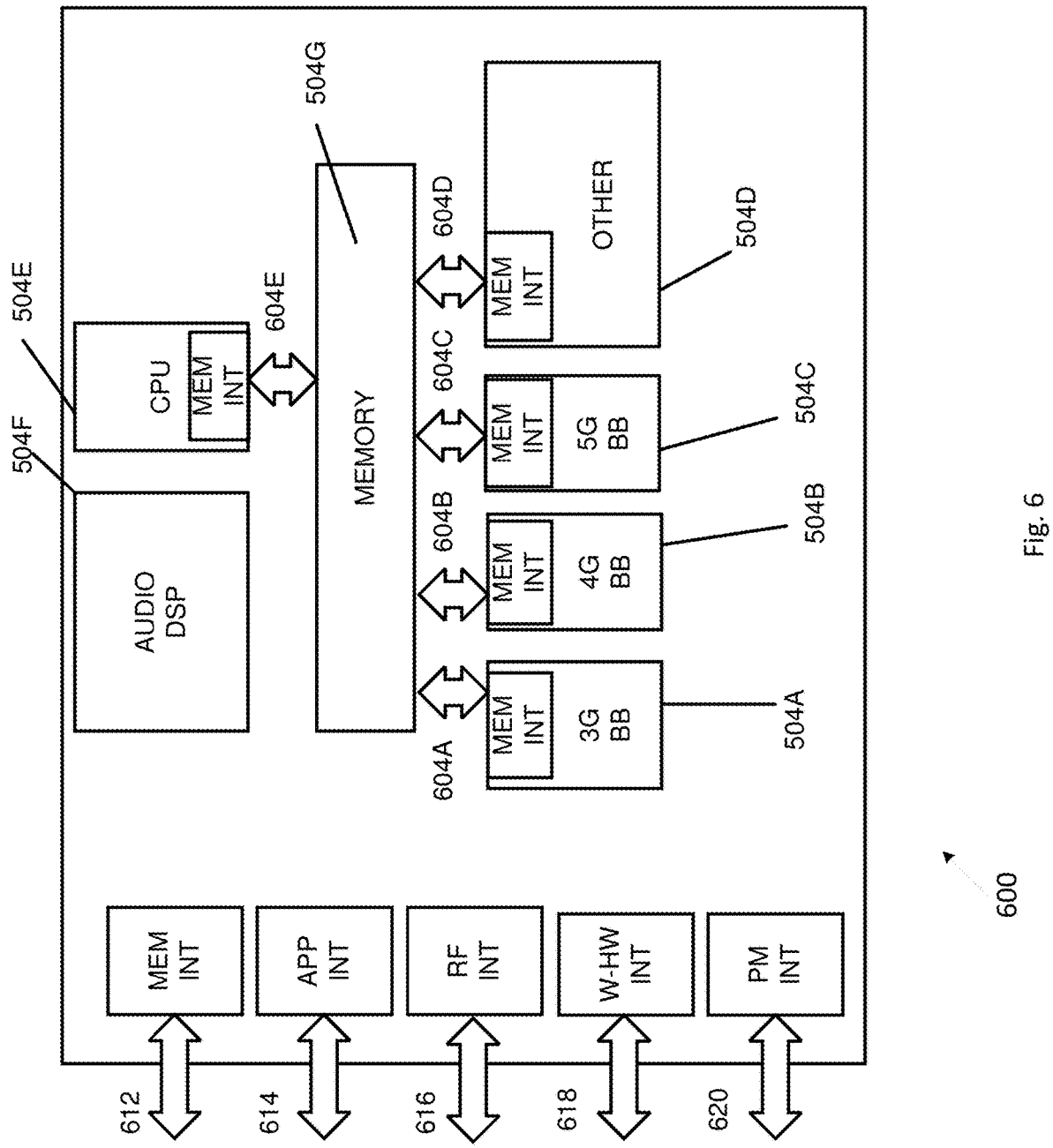
FIG. 6 is a schematic illustration of interfaces of a baseband circuitry, in accordance with some demonstrative embodiments.

Reference is made to FIG. 6, which schematically illustrates interfaces of a baseband circuitry 600, in accordance with some demonstrative embodiments.

In one example, UE 102 (FIG. 1) and/or gNB 140 (FIG. 1) may include one or more elements of baseband circuitry 600.

In some demonstrative embodiments, the baseband circuitry 600, e.g., baseband circuitry 310 (FIG. 3), 410 (FIG. 4) and/or 500 (FIG. 5) may include processors 504A-504E (FIG. 5) and a memory 504G (FIG. 5) utilized by the processors. Each of the processors 504A-504E may include a memory interface, 604A-604E, respectively, to send/receive data to/from the memory 504G.

The baseband circuitry 310 (FIG. 3) and/or 410 (FIG. 4) may further include one or more interfaces to communicatively couple to other circuitries/devices, such as a memory interface 612 (e.g., an interface to send/receive data to/from memory external to the baseband circuitry 310 (FIG. 3) and/or 410 (FIG. 4)), an application circuitry interface 614 (e.g., an interface to send/receive data to/from the application circuitry 305/405 of FIGS. 3-5), an RF circuitry interface 616 (e.g., an interface to send/receive data to/from RF circuitry 506 of FIG. 5), a wireless hardware connectivity interface 618 (e.g., an interface to send/receive data to/from Near Field Communication (NFC) components, Bluetooth® components (e.g., Bluetooth® Low Energy), Wi-Fi® components, and other communication components), and a power management interface 620 (e.g., an interface to send/receive power or control signals to/from the PMIC 425.

Figure 7:
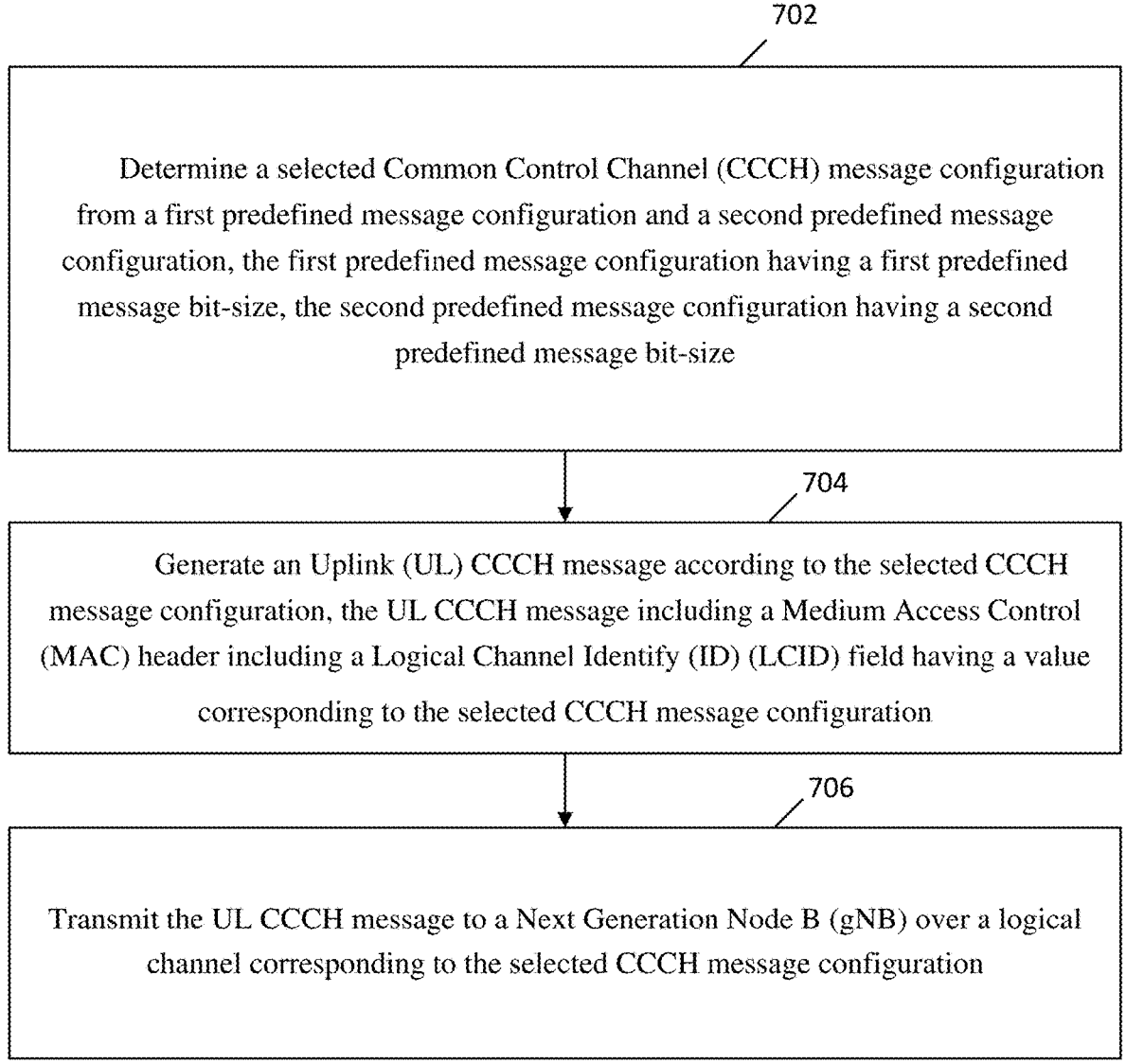
FIG. 7 is a schematic flow-chart illustration of a method of communication over common control channels, in accordance with some demonstrative embodiments.

FIG. 7 is a schematic flow-chart illustration of a method of communication over common control channels, in accordance with some demonstrative embodiments. For example, one or more of the operations of the method of FIG. 7 may be performed by one or more elements of a system, e.g., system 100 (FIG. 1), for example, one or more UEs, e.g., UE 102 (FIG. 1), a radio, e.g., radio 114 (FIG. 1), a receiver, e.g., receiver 116 (FIG. 1), a controller, e.g., controller 124 (FIG. 1), and/or a message processor, e.g., message processor 128 (FIG. 1).

As indicated at block 702, the method may include determining a selected CCCH message configuration from a first predefined message configuration and a second predefined message configuration, the first predefined message configuration having a first predefined message bit-size, the second predefined message configuration having a second predefined message bit-size. For example, controller 124 (FIG. 1) may control, cause and/or trigger UE 102 (FIG. 1) to determine the selected CCCH message configuration from the first predefined message configuration and the second predefined message configuration, the first predefined message configuration having the first predefined message bit-size, and the second predefined message configuration having the second predefined message bit-size, e.g., as described above.

As indicated at block 704, the method may include generating an UL CCCH message according to the selected CCCH message configuration, the UL CCCH message including a MAC header including an LCID field having a value corresponding to the selected CCCH message configuration. For example, controller 124 (FIG. 1) may control, cause and/or trigger UE 102 (FIG. 1) to generate the UL CCCH message according to the selected CCCH message configuration, the UL CCCH message including the MAC header including the LCID field having the value corresponding to the selected CCCH message configuration, e.g., as described above.

As indicated at block 706, the method may include transmitting the UL CCCH message to a gNB over a logical channel corresponding to the selected CCCH message configuration. For example, controller 124 (FIG. 1) may control, cause and/or trigger UE 102 (FIG. 1) to transmit the UL CCCH message to gNB 140 (FIG. 1) over the logical channel corresponding to the selected CCCH message configuration, e.g., as described above.

Figure 8:
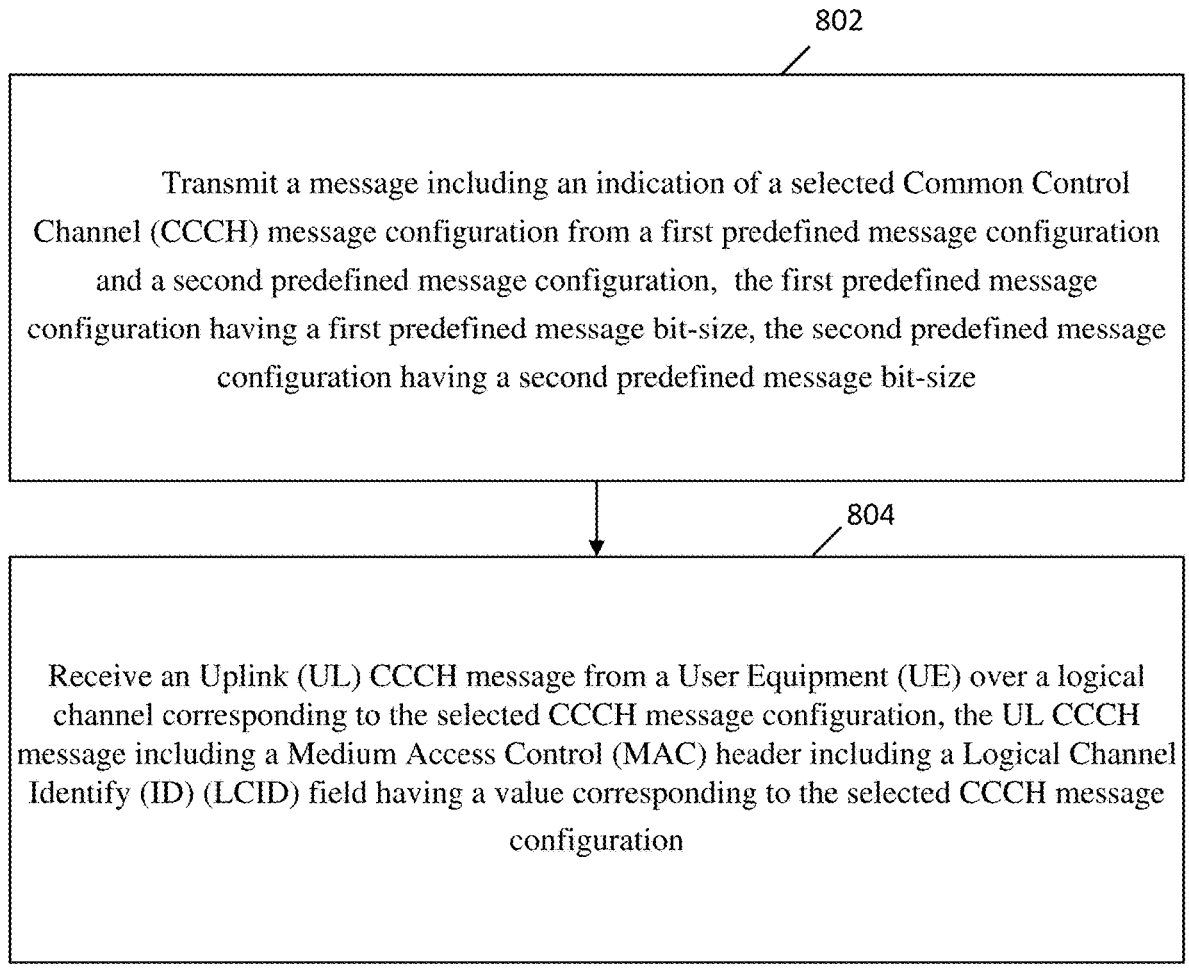
FIG. 8 is a schematic flow-chart illustration of a method of communication over common control channels, in accordance with some demonstrative embodiments.

FIG. 8 is a schematic flow-chart illustration of a method of communication over common control channels, in accordance with some demonstrative embodiments. For example, one or more of the operations of the method of FIG. 8 may be performed by one or more elements of a system, e.g., system 100 (FIG. 1), for example, one or more gNBs, e.g., gNB 140 (FIG. 1), a radio, e.g., radio 144 (FIG. 1), a receiver, e.g., receiver 146 (FIG. 1), a controller, e.g., controller 154 (FIG. 1), and/or a message processor, e.g., message processor 158 (FIG. 1).

As indicated at block 802, the method may include transmitting a message including an indication of a selected CCCH message configuration from a first predefined message configuration and a second predefined message configuration, the first predefined message configuration having a first predefined message bit-size, the second predefined message configuration having a second predefined message bit-size. For example, controller 154 (FIG. 1) may control, cause and/or trigger gNB 140 (FIG. 1) to transmit the message including the indication of the selected CCCH message configuration from the first predefined message configuration and the second predefined message configuration, the first predefined message configuration having the first predefined message bit-size, and the second predefined message configuration having the second predefined message bit-size, e.g., as described above.

As indicated at block 804, the method may include receiving an UL CCCH message from a UE over a logical channel corresponding to the selected CCCH message configuration, the UL CCCH message including a MAC header including an LCID field having a value corresponding to the selected CCCH message configuration. For example, controller 154 (FIG. 1) may control, cause and/or trigger gNB 140 (FIG. 1) and/or radio 144 (FIG. 1) to receive the UL CCCH message from UE 102 (FIG. 1) over the logical channel corresponding to the selected CCCH message configuration, the UL CCCH message including the MAC header including the LCID field having the value corresponding to the selected CCCH message configuration, e.g., as described above.

Figure 9:
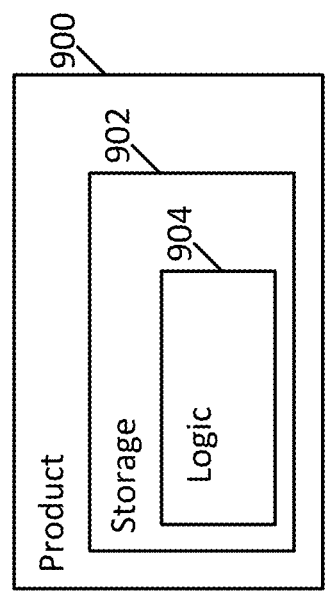
FIG. 9 is a schematic illustration of a product, in accordance with some demonstrative embodiments.

Reference is made to FIG. 9, which schematically illustrates a product of manufacture 900, in accordance with some demonstrative embodiments. Product 900 may include one or more tangible computer-readable ("machine-readable") non-transitory storage media 902, which may include computer-executable instructions, e.g., implemented by logic 904, operable to, when executed by at least one computer processor, enable the at least one computer processor to implement one or more operations at UE 102 (FIG. 1), gNB 140 (FIG. 1), radio 114 (FIG. 1), radio 144 (FIG. 1), controller 124 (FIG. 1), controller 154 (FIG. 1), receiver 116 (FIG. 1), transmitter 118 (FIG. 1), message processor 128 (FIG. 1), receiver 146 (FIG. 1), transmitter 158 (FIG. 1), and/or message processor 158 (FIG. 1), to cause UE 102 (FIG. 1), gNB 140 (FIG. 1), radio 114 (FIG. 1), radio 144 (FIG. 1), controller 124 (FIG. 1), controller 154 (FIG. 1), receiver 116 (FIG. 1), transmitter 118 (FIG. 1), message processor 128 (FIG. 1), receiver 146 (FIG. 1), transmitter 158 (FIG. 1), and/or message processor 158 (FIG. 1) to perform, trigger and/or implement one or more operations and/or functionalities, and/or to perform, trigger and/or implement one or more operations and/or functionalities described with reference to the FIGS. 1, 2, 3, 4, 5, 6, 7 and/or 8, and/or one or more operations described herein. The phrases "non-transitory machine-readable medium" and "computer-readable non-transitory storage media" may be directed to include all computer-readable media, with the sole exception being a transitory propagating signal.

In some demonstrative embodiments, product 900 and/or machine-readable storage media 902 may include one or more types of computer-readable storage media capable of storing data, including volatile memory, non-volatile memory, removable or non-removable memory, erasable or non-erasable memory, writeable or re-writeable memory, and the like. For example, machine-readable storage media 902 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 904 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 904 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a User Equipment (UE) to determine a selected Common Control Channel (CCCH) message configuration from a first predefined message configuration and a second predefined message configuration, the first predefined message configuration having a first predefined message bit-size, the second predefined message configuration having a second predefined message bit-size; generate an Uplink (UL) CCCH message according to the selected CCCH message configuration, the UL CCCH message comprising a Medium Access Control (MAC) header comprising a Logical Channel Identify (ID) (LCID) field having a value corresponding to the selected CCCH message configuration; and transmit the UL CCCH message to a Next Generation Node B (gNB) over a logical channel corresponding to the selected CCCH message configuration.

Example 2 includes the subject matter of Example 1, and optionally, wherein the apparatus is configured to cause the UE to transmit the UL CCCH message over a first logical channel (CCCH channel), when the selected CCCH message configuration comprises the first predefined message configuration, and to transmit the UL CCCH message over a second logical channel (CCCH1 channel), when the selected CCCH message configuration comprises the second predefined message configuration.

Example 3 includes the subject matter of Example 1 or 2, and optionally, wherein the first predefined message configuration comprises a first identifier field having a first predefined bit-size, and the second predefined message configuration comprises a second identifier field having a second predefined bit-size different from the first predefined bit-size Example 4 includes the subject matter of any one of Examples 1-3, and optionally, wherein the apparatus is configured to cause the UE to set the LCID field to a first predefined LCID value when the selected CCCH message configuration comprises the first predefined message configuration, and to set the LCID field to a second predefined LCID value, different from the first predefined LCID value, when the selected CCCH message configuration comprises the second predefined message configuration.

Example 5 includes the subject matter of any one of Examples 1-4, and optionally, wherein the apparatus is configured to cause the UE to determine the selected CCCH message configuration based on an indication in a message from the gNB.

Example 6 includes the subject matter of any one of Examples 1-5, and optionally, wherein the apparatus is configured to cause the UE to determine the selected CCCH message configuration based on an indication in a broadcast message from the gNB.

Example 7 includes the subject matter of any one of Examples 1-6, and optionally, wherein the first predefined message configuration corresponds to a first CCCH message type, and the second predefined message configuration corresponds to a second CCCH message type different from the first CCCH message type.

Example 8 includes the subject matter of any one of Examples 1-7, and optionally, wherein the UL CCCH message comprises a Radio Resource Control (RRC) message.

Example 9 includes the subject matter of any one of Examples 1-8, and optionally, wherein the UL CCCH message comprises a Radio Resource Control (RRC) Resume Request message.

Example 10 includes the subject matter of any one of Examples 1-9, and optionally, wherein the first predefined message configuration comprises a first Radio Resource Control (RRC) Resume Request (RRCResumeRequest) message configuration, and the second predefined message configuration comprises a second RRC Resume Request (RRCResumeRequest1) message configuration.

Example 11 includes the subject matter of Example 10, and optionally, wherein the first RRC Resume Request message configuration comprises a first resume identity (ResumeIdentity) field having a first predefined ResumeIdentity bit-size, and the second RRC Resume Request message configuration comprises a second resume identity field having a second predefined ResumeIdentity bit-size shorter than the first predefined ResumeIdentity bit-size.

Example 12 includes the subject matter of Example 10 or 11, and optionally, wherein the second RRC Resume Request message configuration comprises a 40-bit resume identity (ResumeIdentity) field configured for a 40-bit Radio Network Temporary Identity (RNTI) value, and the first RRC Resume Request message configuration comprises a 16-bit resume identity field configured for a 16-bit truncated RNTI value.

Example 13 includes the subject matter of any one of Examples 9-12, and optionally, wherein the RRC Resume Request message comprises a 16-bit resume Message Authentication Code for Integrity (resumeMAC-I) field, and a Resume Cause (ResumeCause) field.

Example 14 includes the subject matter of any one of Examples 1-8, and optionally, wherein the UL CCCH message comprises a Radio Resource Control (RRC) Setup Request, an RRC Reestablishment Request, or an RRC System Information (Info) Request.

Example 15 includes the subject matter of any one of Examples 1-14, and optionally, wherein the first predefined message bit-size comprises a 48-bit size, and the second predefined message bit-size comprises a 64-bit size.

Example 16 includes the subject matter of any one of Examples 1-15, and optionally, comprising a radio to transmit the UL CCCH message.

Example 17 includes the subject matter of Example 16, and optionally, comprising one or more antennas connected to the radio, a memory, and a processor.

Example 18 includes an apparatus comprising logic and circuitry configured to cause a Next Generation Node B (gNB) to transmit a message comprising an indication of a selected Common Control Channel (CCCH) message configuration from a first predefined message configuration and a second predefined message configuration, the first predefined message configuration having a first predefined message bit-size, the second predefined message configuration having a second predefined message bit-size; and receive an Uplink (UL) CCCH message from a User Equipment (UE) over a logical channel corresponding to the selected CCCH message configuration, the UL CCCH message comprising a Medium Access Control (MAC) header comprising a Logical Channel Identify (ID) (LCID) field having a value corresponding to the selected CCCH message configuration.

Example 19 includes the subject matter of Example 18, and optionally, wherein the apparatus is configured to cause the gNB to receive the UL CCCH message over a first logical channel (CCCH channel), when the selected CCCH message configuration comprises the first predefined message configuration, and to receive the UL CCCH message over a second logical channel (CCCH1 channel), when the selected CCCH message configuration comprises the second predefined message configuration.

Example 20 includes the subject matter of Example 18 or 19, and optionally, wherein the first predefined message configuration comprises a first identifier field having a first predefined bit-size, and the second predefined message configuration comprises a second identifier field having a second predefined bit-size different from the first predefined bit-size.

Example 21 includes the subject matter of any one of Examples 18-20, and optionally, wherein the LCID field comprises a first predefined LCID value when the selected CCCH message configuration comprises the first predefined message configuration, and wherein the LCID field comprises a second predefined LCID value, different from the first predefined LCID value, when the selected CCCH message configuration comprises the second predefined message configuration.

Example 22 includes the subject matter of any one of Examples 18-21, and optionally, wherein the first predefined message configuration corresponds to a first CCCH message type, and the second predefined message configuration corresponds to a second CCCH message type different from the first CCCH message type.

Example 23 includes the subject matter of any one of Examples 18-22, and optionally, wherein the UL CCCH message comprises a Radio Resource Control (RRC) message.

Example 24 includes the subject matter of any one of Examples 18-23, and optionally, wherein the UL CCCH message comprises a Radio Resource Control (RRC) Resume Request message.

Example 25 includes the subject matter of any one of Examples 18-24, and optionally, wherein the first predefined message configuration comprises a first Radio Resource Control (RRC) Resume Request (RRCResumeRequest) message configuration, and the second predefined message configuration comprises a second RRC Resume Request (RRCResumeRequest1) message configuration.

Example 26 includes the subject matter of Example 25, and optionally, wherein the first RRC Resume Request message configuration comprises a first resume identity (ResumeIdentity) field having a first predefined ResumeIdentity bit-size, and the second RRC Resume Request message configuration comprises a second resume identity field having a second predefined ResumeIdentity bit-size shorter than the first predefined ResumeIdentity bit-size.

Example 27 includes the subject matter of Example 25 or 26, and optionally, wherein the second RRC Resume Request message configuration comprises a 40-bit resume identity (ResumeIdentity) field configured for a 40-bit Radio Network Temporary Identity (RNTI) value, and the first RRC Resume Request message configuration comprises a 16-bit resume identity field configured for a 16-bit truncated RNTI value.

Example 28 includes the subject matter of any one of Examples 24-27, and optionally, wherein the RRC Resume Request message comprises a 16-bit resume Message Authentication Code for Integrity (resumeMAC-I) field, and a Resume Cause (ResumeCause) field.

Example 29 includes the subject matter of any one of Examples 18-23, and optionally, wherein the UL CCCH message comprises a Radio Resource Control (RRC) Setup Request, an RRC Reestablishment Request, or an RRC System Information (Info) Request.

Example 30 includes the subject matter of any one of Examples 18-29, and optionally, wherein the first predefined message bit-size comprises a 48-bit size, and the second predefined message bit-size comprises a 64-bit size.

Example 31 includes the subject matter of any one of Examples 18-30, and optionally, wherein the apparatus is configured to cause the gNB to broadcast the message.

Example 32 includes the subject matter of any one of Examples 18-31, and optionally, comprising a radio to transmit the message and to receive the CCCH message.

Example 33 includes the subject matter of Example 32, and optionally, comprising one or more antennas connected to the radio, a memory, and a processor.

Example 34 comprises an apparatus comprising means for executing any of the described operations of Examples 1-33.

Example 35 comprises a machine readable medium that stores instructions for execution by a processor to perform any of the described operations of Examples 1-33.

Example 36 comprises an apparatus comprising: a memory interface; and processing circuitry configured to: perform any of the described operations of Examples 1-33.

Example 37 comprises a method to perform any of the described operations of Examples 1-33.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a User Equipment (UE) to:
   determine a Common Control Channel (CCCH) message configuration selected from a first predefined message configuration that includes a first Radio Resource Control (RRC) message configuration, and a second predefined message configuration that includes a second RRC message configuration, the first predefined message configuration having a first predefined message bit-size, the second predefined message configuration having a second predefined message bit-size;

generate an Uplink (UL) CCCH message according to the selected CCCH message configuration, the UL CCCH message comprising a RRC message having an RRC System Information (Info) Request, and a Medium Access Control (MAC) header comprising a Logical Channel Identify (ID) (LCID) field having a value corresponding to the selected CCCH message configuration; and transmit the UL CCCH message to a base station over a logical channel corresponding to the selected CCCH message configuration.

2. The apparatus of claim 1, wherein the logic and circuitry are configured to cause the UE to transmit the UL CCCH message over a first logical channel (CCCH channel), when the selected CCCH message configuration comprises the first predefined message configuration, and to transmit the UL CCCH message over a second logical channel (CCCH1 channel), when the selected CCCH message configuration comprises the second predefined message configuration.

3. The apparatus of claim 1, wherein the first predefined message configuration comprises a first identifier field having a first predefined bit-size, and the second predefined message configuration comprises a second identifier field having a second predefined bit-size different from the first predefined bit-size.

4. The apparatus of claim 1, wherein the logic and circuitry are configured to cause the UE to set the LCID field to a first predefined LCID value when the selected CCCH message configuration comprises the first predefined message configuration, and to set the LCID field to a second predefined LCID value, different from the first predefined LCID value, when the selected CCCH message configuration comprises the second predefined message configuration.

5. The apparatus of claim 1, wherein the logic and circuitry are configured to cause the UE to determine the selected CCCH message configuration based on an indication in a message from the base station.

6. The apparatus of claim 1, wherein the first predefined message configuration corresponds to a first CCCH message type, and the second predefined message configuration corresponds to a second CCCH message type different from the first CCCH message type.

7. The apparatus of claim 1, wherein the first predefined message configuration comprises a first Radio Resource Control (RRC) Resume Request (RRCResumeRequest) message configuration, and the second predefined message configuration comprises a second RRC Resume Request (RRCResumeRequest1) message configuration.

8. The apparatus of claim 7, wherein the first RRC Resume Request message configuration comprises a first resume identity (ResumeIdentity) field having a first predefined ResumeIdentity bit-size, and the second RRC Resume Request message configuration comprises a second resume identity field having a second predefined ResumeIdentity bit-size shorter than the first predefined ResumeIdentity bit-size.

9. The apparatus of claim 1, wherein the UL CCCH message further comprises a Radio Resource Control (RRC) Setup Request, or an RRC Reestablishment Request.

10. The apparatus of claim 1 comprising a radio to transmit the UL CCCH message.

11. The apparatus of claim 10 comprising one or more antennas connected to the radio, a memory, and a processor.

12. An apparatus comprising logic and circuitry configured to cause a base station to:

transmit a message comprising an indication of a Common Control Channel (CCCH) message configuration selected from a first predefined message configuration that includes a first Radio Resource Control (RRC) message configuration, and a second predefined message configuration that includes a second RRC message configuration, the first predefined message configuration having a first predefined message bit-size, the second predefined message configuration having a second predefined message bit-size; and receive an Uplink (UL) CCCH message from a User Equipment (UE) over a logical channel corresponding to the selected CCCH message configuration, the UL CCCH message comprising a RRC message having an RRC System Information (Info) Request, and a Medium Access Control (MAC) header comprising a Logical Channel Identify (ID) (LCID) field having a value corresponding to the selected CCCH message configuration.

13. The apparatus of claim 12, wherein the logic and circuitry are configured to cause the base station to receive the UL CCCH message over a first logical channel (CCCH channel), when the selected CCCH message configuration comprises the first predefined message configuration, and to receive the UL CCCH message over a second logical channel (CCCH1 channel), when the selected CCCH message configuration comprises the second predefined message configuration.

14. The apparatus of claim 12, wherein the first predefined message configuration comprises a first identifier field having a first predefined bit-size, and the second predefined message configuration comprises a second identifier field having a second predefined bit-size different from the first predefined bit-size.

15. The apparatus of claim 12, wherein the LCID field comprises a first predefined LCID value when the selected CCCH message configuration comprises the first predefined message configuration, and wherein the LCID field comprises a second predefined LCID value, different from the first predefined LCID value, when the selected CCCH message configuration comprises the second predefined message configuration.

16. The apparatus of claim 12, wherein the first predefined message configuration corresponds to a first CCCH message type, and the second predefined message configuration corresponds to a second CCCH message type different from the first CCCH message type.

17. The apparatus of claim 12, wherein the first predefined message configuration comprises a first Radio Resource Control (RRC) Resume Request (RRCResumeRequest) message configuration, and the second predefined message configuration comprises a second RRC Resume Request (RRCResumeRequest1) message configuration.

18. The apparatus of claim 17, wherein the first RRC Resume Request message configuration comprises a first resume identity (ResumeIdentity) field having a first predefined ResumeIdentity bit-size, and the second RRC Resume Request message configuration comprises a second resume identity field having a second predefined ResumeIdentity bit-size shorter than the first predefined ResumeIdentity bit-size.

19. The apparatus of claim 12 comprising a radio to transmit the message and to receive the UL CCCH message.

20. A product comprising one or more tangible computer-readable non-transitory storage media comprising computer-executable instructions operable to, when executed by at least one processor, enable the at least one processor to cause a User Equipment (UE) to:

determine a Common Control Channel (CCCH) message configuration selected from a first predefined message configuration that includes a first Radio Resource Control (RRC) message configuration, and a second predefined message configuration that includes a second RRC message configuration, the first predefined message configuration having a first predefined message bit-size, the second predefined message configuration having a second predefined message bit-size;

generate an Uplink (UL) CCCH message according to the selected CCCH message configuration, the UL CCCH message comprising a RRC message having an RRC System Information (Info) Request, and a Medium Access Control (MAC) header comprising a Logical Channel Identify (ID) (LCID) field having a value corresponding to the selected CCCH message configuration; and transmit the UL CCCH message to a base station over a logical channel corresponding to the selected CCCH message configuration.

21. The product of claim 20, wherein the instructions, when executed, cause the UE to transmit the UL CCCH message over a first logical channel (CCCH channel), when the selected CCCH message configuration comprises the first predefined message configuration, and to transmit the UL CCCH message over a second logical channel (CCCH1 channel), when the selected CCCH message configuration comprises the second predefined message configuration.

22. The product of claim 20, wherein the instructions, when executed, cause the UE to set the LCID field to a first predefined LCID value when the selected CCCH message configuration comprises the first predefined message configuration, and to set the LCID field to a second predefined LCID value, different from the first predefined LCID value, when the selected CCCH message configuration comprises the second predefined message configuration.

23. A product comprising one or more tangible computer-readable non-transitory storage media comprising computer-executable instructions operable to, when executed by at least one processor, enable the at least one processor to cause a base station to:

transmit a message comprising an indication of a Common Control Channel (CCCH) message configuration selected from a first predefined message configuration that includes a first Radio Resource Control (RRC) message configuration, and a second predefined message configuration that includes a second RRC message configuration, the first predefined message configuration having a first predefined message bit-size, the second predefined message configuration having a second predefined message bit-size; and receive an Uplink (UL) CCCH message from a User Equipment (UE) over a logical channel corresponding to the selected CCCH message configuration, the UL CCCH message comprising a RRC message having an RRC System Information (Info) Request, and a Medium Access Control (MAC) header comprising a Logical Channel Identify (ID) (LCID) field having a value corresponding to the selected CCCH message configuration.

24. The product of claim 23, wherein the instructions, when executed, cause the base station to receive the UL CCCH message over a first logical channel (CCCH channel), when the selected CCCH message configuration comprises the first predefined message configuration, and to receive the UL CCCH message over a second logical channel (CCCH1 channel), when the selected CCCH message configuration comprises the second predefined message configuration.

25. The product of claim 24, wherein the LCID field comprises a first predefined LCID value when the selected CCCH message configuration comprises the first predefined message configuration, and wherein the LCID field comprises a second predefined LCID value, different from the first predefined LCID value, when the selected CCCH message configuration comprises the second predefined message configuration.

* * * * *